United States Patent
Kachmar et al.

(10) Patent No.: US 9,569,179 B1
(45) Date of Patent: Feb. 14, 2017

(54) MODIFYING MODELS BASED ON PROFILING INFORMATION

(71) Applicant: The MathWorks, Inc., Natick, MA (US)

(72) Inventors: Mazen Kachmar, Waterbeach (GB); David Koh, Boston, MA (US); Pieter J. Mosterman, Framingham, MA (US); Murat Belge, Westford, MA (US)

(73) Assignee: The MathWorks, Inc., Natick, MA (US)

( * ) Notice: Subject to any disclaimer, the term of this patent is extended or adjusted under 35 U.S.C. 154(b) by 55 days.

(21) Appl. No.: 14/559,551

(22) Filed: Dec. 3, 2014

(51) Int. Cl.
*G06F 9/45* (2006.01)
*G06F 9/44* (2006.01)
*G06F 11/34* (2006.01)
*G06F 11/32* (2006.01)

(52) U.S. Cl.
CPC . *G06F 8/30* (2013.01); *G06F 8/34* (2013.01); *G06F 11/3409* (2013.01); *G06F 8/35* (2013.01); *G06F 8/443* (2013.01); *G06F 9/443* (2013.01); *G06F 11/323* (2013.01); *G06F 2201/865* (2013.01)

(58) Field of Classification Search
CPC ............... G06F 8/10; G06F 8/20; G06F 8/35; G06F 8/443; G06F 9/443; G06F 11/323; G06F 11/3419; G06F 11/3423; G06F 11/3452; G06F 11/3466; G06F 2201/865; G06F 2201/88; G06F 8/34; G06F 11/3409
USPC ............... 717/106, 151, 152, 153, 154, 158
See application file for complete search history.

(56) References Cited

U.S. PATENT DOCUMENTS

| | | | |
|---|---|---|---|
| 6,341,371 B1 | 1/2002 | Tandri | |
| 7,194,736 B2 | 3/2007 | Shi et al. | |
| 7,739,099 B2 | 6/2010 | Liu et al. | |
| 8,156,481 B1 | 4/2012 | Koh et al. | |
| 8,418,158 B1 | 4/2013 | Koh et al. | |
| 2009/0249281 A1* | 10/2009 | Fritzsche | G06F 11/3447 717/104 |
| 2012/0124363 A1* | 5/2012 | Dietrich | G06F 11/3442 713/100 |

OTHER PUBLICATIONS

Berndl et al., "Dynamic Profiling and Trace Cache Generation," 2003, IEEE, pp. 1-10.
Co-pending U.S. Appl. No. 13/857,712, entitled "Profiler-Based Optimization of Automatically Generated Code", by David Koh et al., filed Apr. 5, 2013, 74 pages.

* cited by examiner

*Primary Examiner* — Wei Zhen
*Assistant Examiner* — Mohammed Huda
(74) *Attorney, Agent, or Firm* — Harrity & Harrity, LLP

(57) ABSTRACT

A method may include receiving, by a device, information associated with a model. The method may include determining, by the device, performance criteria for program code generated based on the model. The method may include determining, by the device, profiling information associated with the program code. The method may include determining, by the device and based on the profiling information, that the performance criteria is not satisfied. The method may include applying, by the device and based on determining that the performance criteria is not satisfied, a modification technique to a portion of the model to create a modified model. The modification technique may be applied to the portion of the model to cause program code, generated based on the modified model, to satisfy the performance criteria.

33 Claims, 15 Drawing Sheets

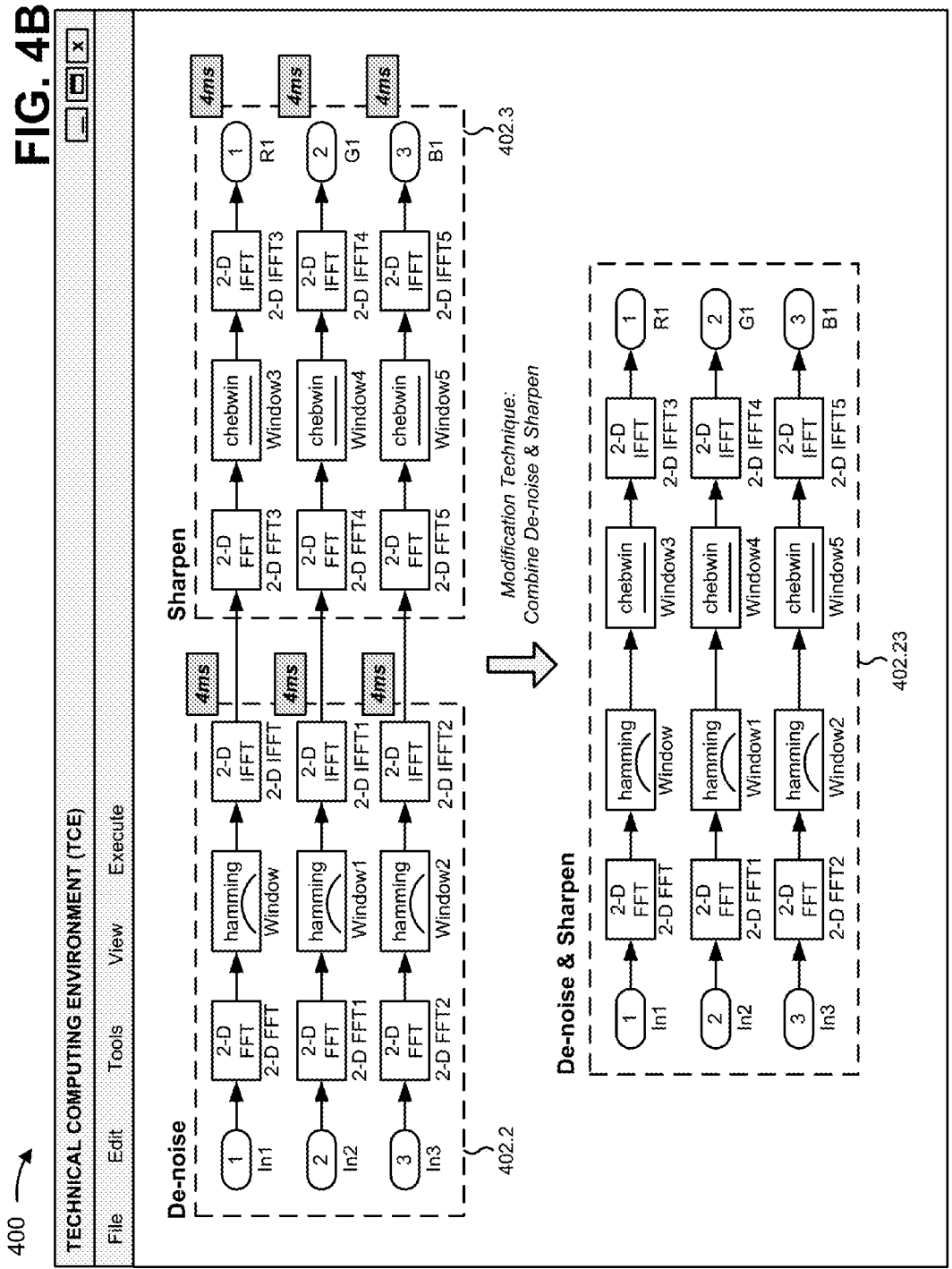

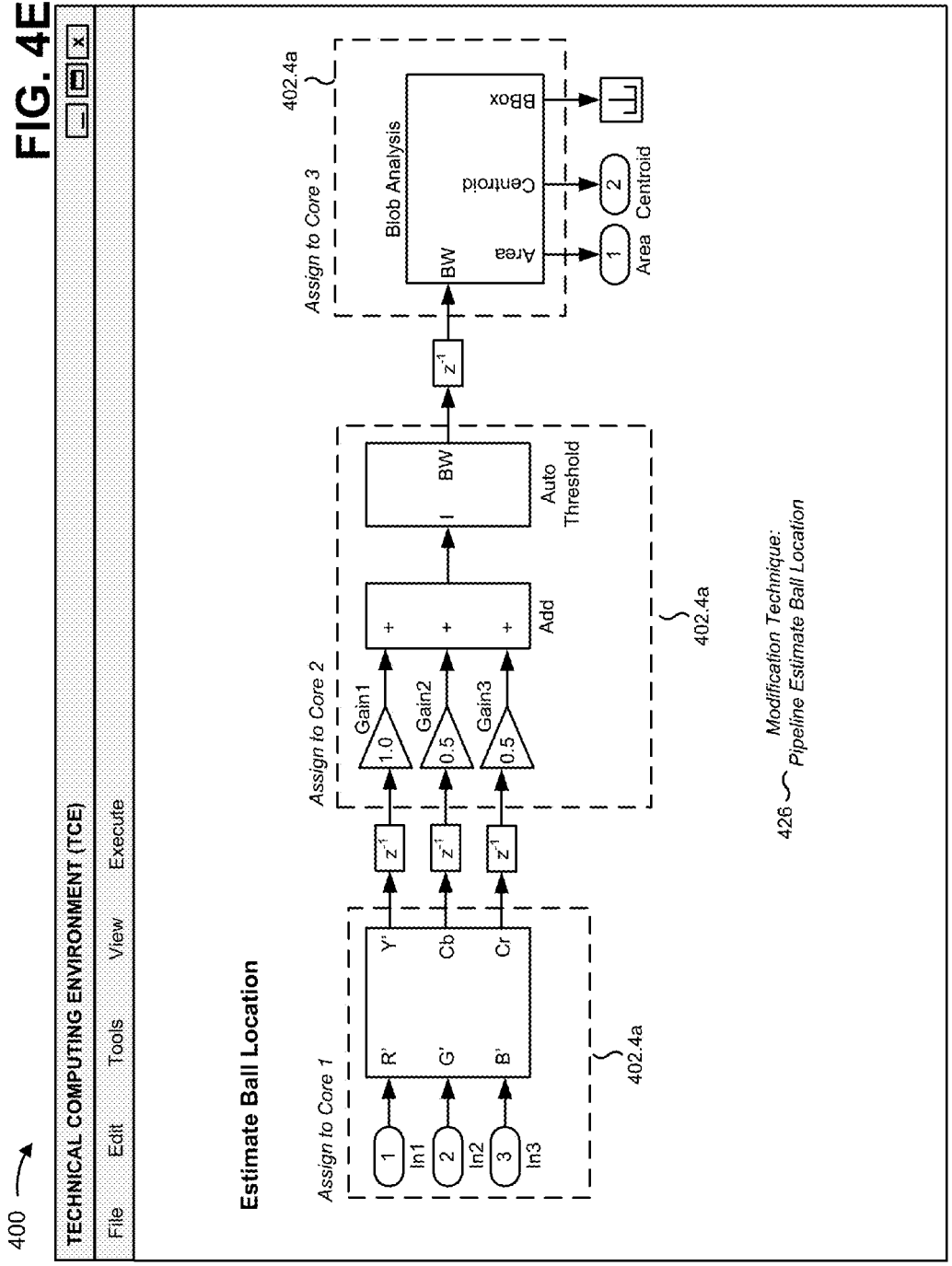

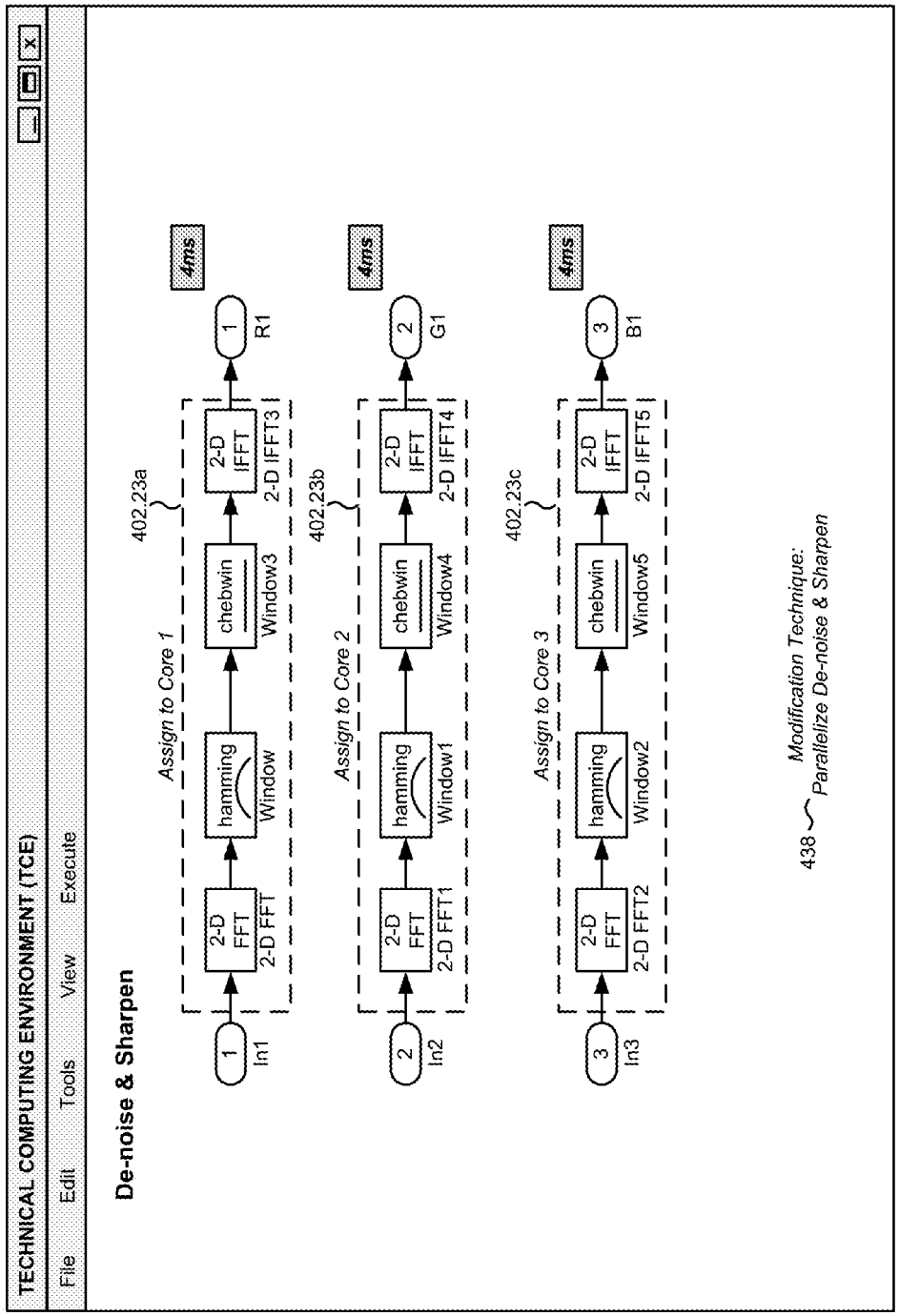

MODIFYING MODELS BASED ON PROFILING INFORMATION

BRIEF DESCRIPTION OF THE DRAWINGS

FIGS. 4A-4I are diagrams of an example implementation of applying, to a model, one or more modification techniques in order to generate program code, associated with the model, that satisfies a set of performance criteria;

DETAILED DESCRIPTION

The following detailed description of example implementations refers to the accompanying drawings. The same reference numbers in different drawings may identify the same or similar elements.

A model (e.g., a graphical model, a textual model, etc.), associated with a technical computing environment (TCE), may include a group of model components (e.g., one or more blocks within a block, one or more blocks, one or more subsystems, etc.), and the TCE may be capable of generating program code (e.g., embedded code for particular target hardware, such as a particular type of processor, a particular build version of a type of processor, etc.) associated with the model. In some cases, a set of performance criteria, including one or more performance criteria, may identify performance criteria associated with one or more performance metrics that are to be satisfied by the program code. As such, the set of performance criteria may dictate a manner in which the program code is generated. For example, the set of performance criteria may indicate that the program code, when executed, is to achieve a threshold amount of execution throughput, a threshold amount of latency, a threshold memory usage, a threshold amount of power usage, a threshold amount of input/output (I/O) interface usage, or the like. In some implementations, the set of performance criteria may be obtained via user input provided by a user (e.g., a designer of the model). Additionally, or alternatively, the set of performance criteria may be obtained based on the target hardware. For example, a client device, associated with the model, may store a set of performance criteria that corresponds to the target hardware (e.g., as determined based on a design constraint associated with a target processor, etc.), and the client device may obtain the set of performance criteria by retrieving the set of performance criteria from storage.

Implementations described herein may allow a TCE to apply, to a model, one or more modification techniques associated with a manner in which program code is generated from the model. The TCE may then determine profiling information (e.g., static profiling information, predicted profiling information, simulated profiling information, run-time profiling information, etc.), associated with the program code, and may apply additional modification techniques such that the program code, when regenerated and executed, satisfies a set of performance criteria.

Figure 1A:
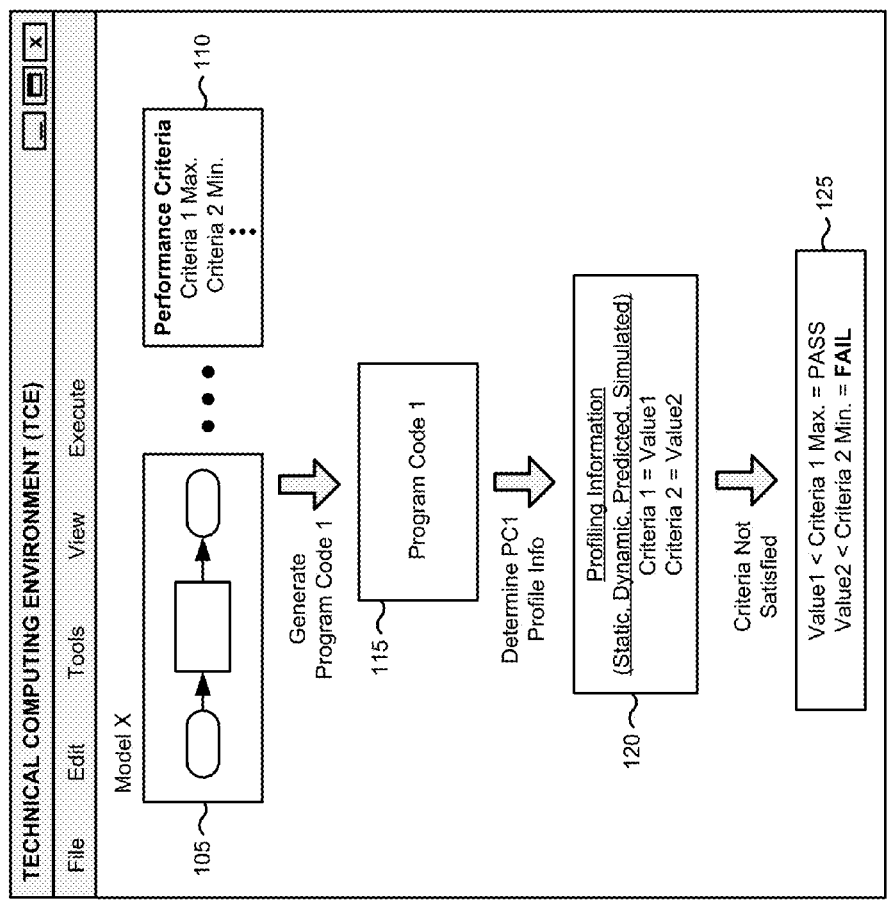
FIGS. 1A and 1B are diagrams of an overview of an example implementation described herein.
Figure 1B:
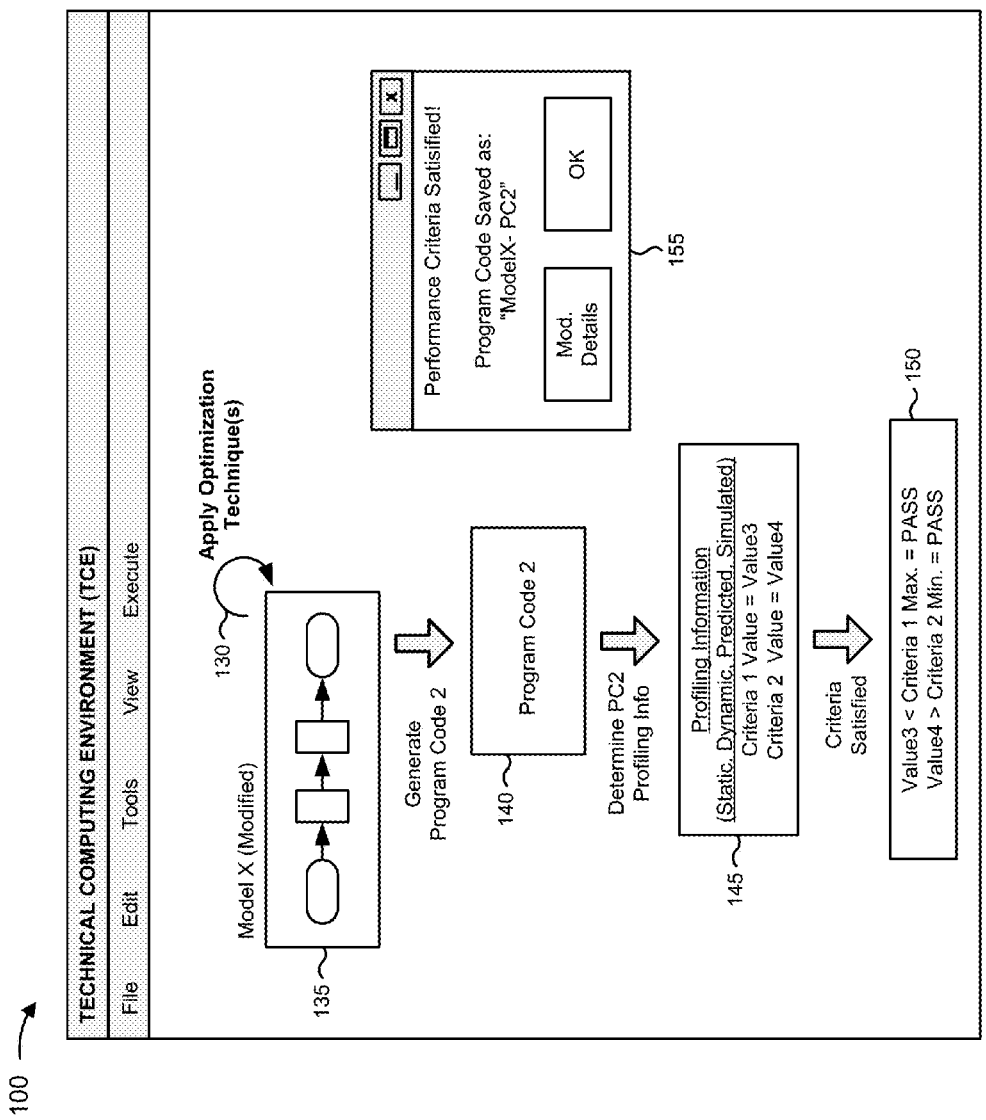

FIGS. 1A and 1B are diagrams of an overview of an example implementation 100 described herein. For the purposes of example implementation 100, assume that a user has constructed, via a TCE, a model (e.g., model X). Further, assume that the user wishes for the TCE to generate program code, associated with the model, that, when executed, satisfies a set of performance criteria. While processes and/or methods described herein are described in the context of a graphical model, in some implementations, these processes and/or methods may also be applied in the context of another type of model, such as a textual model.

As shown in FIG. 1A, and by reference number 105, the TCE may receive (e.g., based on user input, based on loading from memory, or the like) model X that includes a set of blocks. As shown by reference number 110, TCE may obtain (e.g., by receiving from a user, by generating based on user input, by selecting from stored performance criteria and based on a constraint associated with a target processor, etc.) a set of performance criteria associated with program code generated from model X. In some implementations, the set of performance criteria may include information that identifies criteria associated with one or more performance metrics that are to be satisfied by program code generated from the model, such as criteria associated with execution throughput, memory usage, latency, power usage, input/output (I/O) utilization, or the like. As shown by reference number 115, the TCE may generate first program code (i.e., program code 1) for model X. As shown by reference number 120, the TCE may determine profiling information associated with program code 1. In some implementations, the TCE may determine profiling information, associated with program code and/or a model, in order to determine whether the program code satisfies the set of performance criteria. In some implementations, profiling information may include information, associated with program code associated with a model that may be compared to the set of performance criteria in order to determine whether the set of performance criteria is satisfied. For example, the TCE may determine static profiling information, associated with program code 1, by inspecting and/or analyzing the program code. As another example, the TCE may determine predicted profiling information, associated with program code 1, by inputting information, associated with program code 1 and/or model X into a prediction model (e.g., constructed based on historical profiling information) and receiving, as an output, predicted profiling information. As yet another example, the TCE may determine simulated profiling information, associated with model X, by executing model X to perform a simulation. As still another example, the TCE may determine run-time profiling information associated with program code 1, by executing program code 1 in order to determine run-time performance information associated with program code 1. In some implementations, the TCE may cause program code 1 to be executed on a host device (e.g., a device on which the model was generated) in order to determine the run time performance information (e.g., in order to determine an amount of memory consumption associated with executing the program code). Additionally, or alternatively, the TCE may cause program code 1 to be executed on a target device (e.g., a target processor) in order to determine the run time performance information (e.g., in order to determine the amount of memory consumption, in order to determine an execution time associated with executing the program code). As shown, the profiling information may include information to be compared to the set of performance criteria. As shown by reference number 125, the TCE may determine, based on the profiling information, that the set of performance criteria is not satisfied.

As shown in FIG. 1B, and by reference number 130, the TCE may then select (e.g., from a group of modification techniques, where the selection may be based on identifying a performance metric that needs to be reduced, based on analysis of the model, based on user input, based on a default order in which modification techniques are to be applied, based on a predefined order in which techniques are to be applied, etc.) and apply one or more modification techniques to model X such that model X is modified (as shown by reference number 135). In some implementations, the one or more modification techniques may be associated with modifying a portion of model X (i.e., a block, a group of blocks, a subsystem, etc.), modifying a manner in which program code is generated for the model X, modifying a manner in which the program code is executed on target hardware, modifying a code generation setting associated with model X (e.g., a loop unrolling setting, a constant folding setting, a stack size setting, a setting that controls memory usage, an I/O selection setting, a setting associated with processor cores on which the program code is to execute, etc.), or the like. As shown by reference number 140, the TCE may generate second program code (i.e., program code 2) for modified model X. As shown by reference number 145, the TCE may determine profiling information associated with program code 2. As shown, the profiling information, associated with program code 2 and/or modified model X, may include information that is to be compared to the set of performance criteria. As shown by reference number 150, the TCE may determine, based on comparing the profiling information, associated with program code to, and the set of performance criteria, that the set of performance criteria is satisfied by program code 2. As shown by reference number 155, the TCE may then store program code 2 and/or provide an indication to the user that program code 2 satisfies the set of performance criteria.

As such TCE may apply, to a model, one or more modification techniques associated with a manner in which program code is generated from the model, determine profiling information, associated with the program code, and may apply additional modification techniques until the program code, when regenerated and executed for the model, satisfies a set of performance criteria (or until no further modification techniques are to be applied to the model even though the program code does not satisfy the set of performance criteria). Alternatively, in some implementations, the model may be modified such that the program code, when regenerated and executed for the model, is close to satisfying the set of performance criteria as a result of modifying the model.

Figure 2:
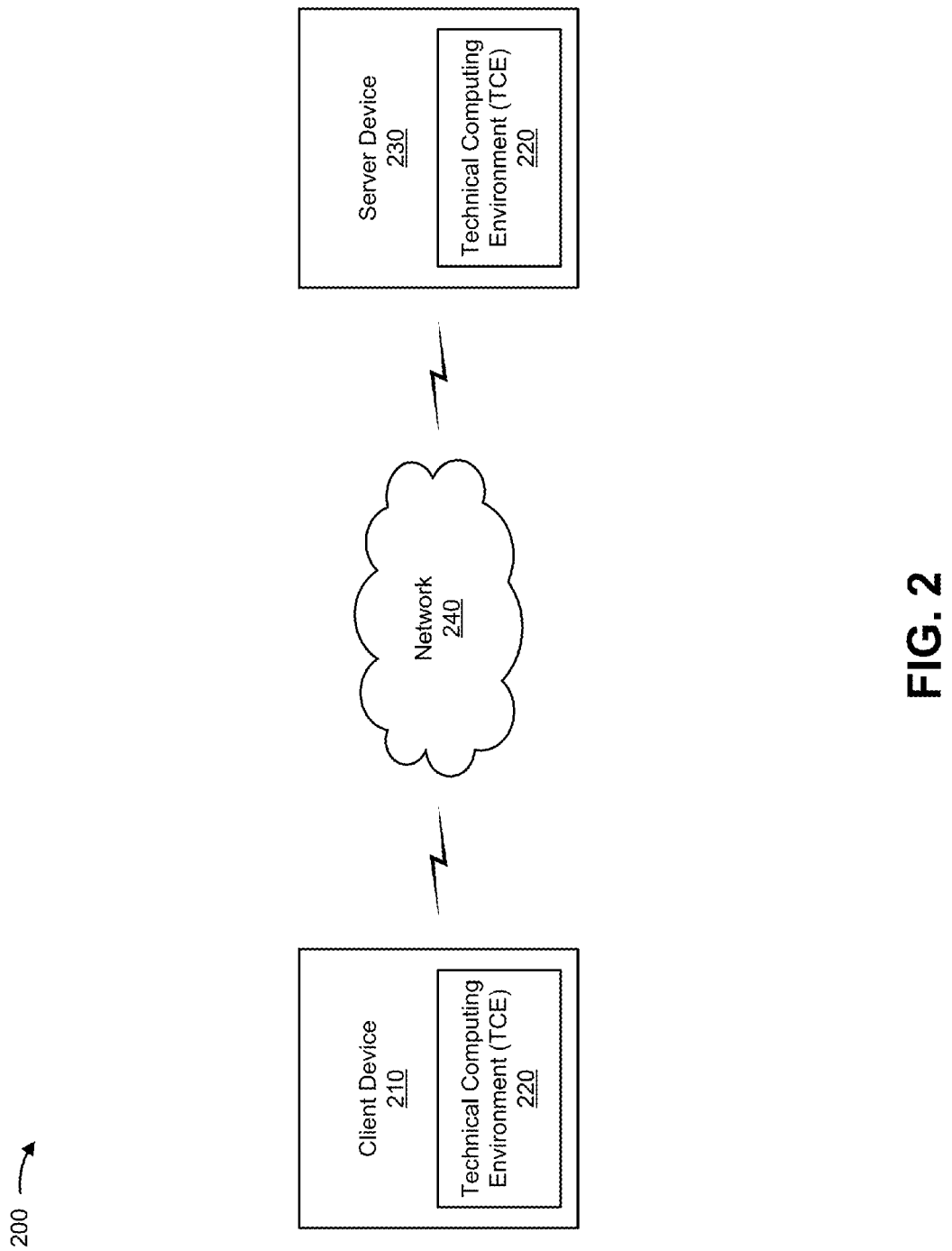
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a client device 210, which may host, access, and/or create a technical computing environment (TCE) 220. Furthermore, environment 200 may include a server device 230, which may include TCE 225, and a network 240. Devices of environment 200 may interconnect via wired connections, wireless connections, or a combination of wired and wireless connections.

Client device 210 may include one or more devices capable of receiving, generating, storing, processing, and/or providing program code and/or information associated with program code for a model. For example, client device 210 may include a computing device, such as a desktop computer, a laptop computer, a tablet computer, a mobile phone (e.g., a smart phone, a radiotelephone, etc.), or a similar device. In some implementations, client device 210 may receive information from and/or transmit information to server device 230.

Client device 210 may host TCE 220. TCE 220 may include any hardware-based component or a combination of hardware and software-based components that provides a computing environment that allows tasks to be performed (e.g., by users) related to disciplines, such as, but not limited to, mathematics, science, engineering, medicine, and business. TCE 220 may include a text-based environment (e.g., MATLAB® software by The MathWorks, Inc., Modelica or Dymola from Dassault Systemes), a graphically-based environment (e.g., Simulink® software, Stateflow® software, SimEvents® software, etc., by The MathWorks, Inc.; VisSim by Visual Solutions; LabView® by National Instruments; Agilent VEE by Agilent Technologies; Advanced Design System (ADS) by Agilent Technologies; Agilent Ptolemy by Agilent Technologies; etc.), or another type of environment, such as a hybrid environment that may include, for example, a text-based environment and a graphically-based environment. TCE 220 may include, for example, a user interface, a graphical block diagramming tool, a set of block libraries, etc. that may allow a user to build, create, design, import, load, define, etc. a model of a system (e.g., a dynamic system, etc.) for purposes of simulating and/or analyzing the system. An application designed in a graphically-based environment (e.g., a block diagram environment (BDE)) may be referred to as a BDE model. In some implementations, the BDE model may be a time based model, where a block of the BDE model may, during simulation and based on a sample time of the block (e.g., a discrete sample time, a continuous sample time, a fixed in minor step sample time, an inherited sample time, a constant sample time, a variable sample time, a triggered sample time, an asynchronous sample time, etc.), produce an output and/or update an internal state of the block. A BDE model may include, but is not limited to, one or more of a block, a subsystem, another BDE model, etc. An application designed in a text based environment (e.g., a textual programming environment (TPE)) may be referred to as a TPE model. According to various embodiments, a TPE model may include, but is not limited to, one or more of a textual program, a script, a function, an object, a method of an object, another TPE model, etc.

Server device 230 may include one or more devices capable of receiving, generating, storing, processing, and/or providing program code and/or information associated with program code for a model. For example, server device 230 may include a computing device, such as a server, a desktop computer, a laptop computer, a tablet computer, or a similar device. In some implementations, server device 230 may host, access, and/or create TCE 225. In some implementations, client device 210 may be used to access one or more TCEs 225 running on one or more server devices 230. For example, multiple server devices 230 may be used to execute program code (e.g., serially or in parallel), and may provide respective results of executing the program code to client device 210. TCE 225 may include any hardware-based component or a combination of hardware and software-based components that provides a computing environment similar to TCE 220 described above.

In some implementations, client device 210 and server device 230 may be owned by different entities. For example, an end user may own client device 210, and a third party may own server device 230. In some implementations, server device 230 may include a device operating in a cloud computing environment. Front-end applications (e.g., a user interface) may be separated from back-end applications (e.g., program code execution). Additionally, or alternatively, server device 230 may perform one, more, or all operations described elsewhere herein as being performed by client device 210.

Network 240 may include one or more wired and/or wireless networks. For example, network 240 may include a cellular network, a public land mobile network (PLMN), a local area network (LAN), a wide area network (WAN), a metropolitan area network (MAN), a telephone network (e.g., the Public Switched Telephone Network (PSTN)), an ad hoc network, an intranet, the Internet, a fiber optic-based network, a private network, a cloud computing network, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
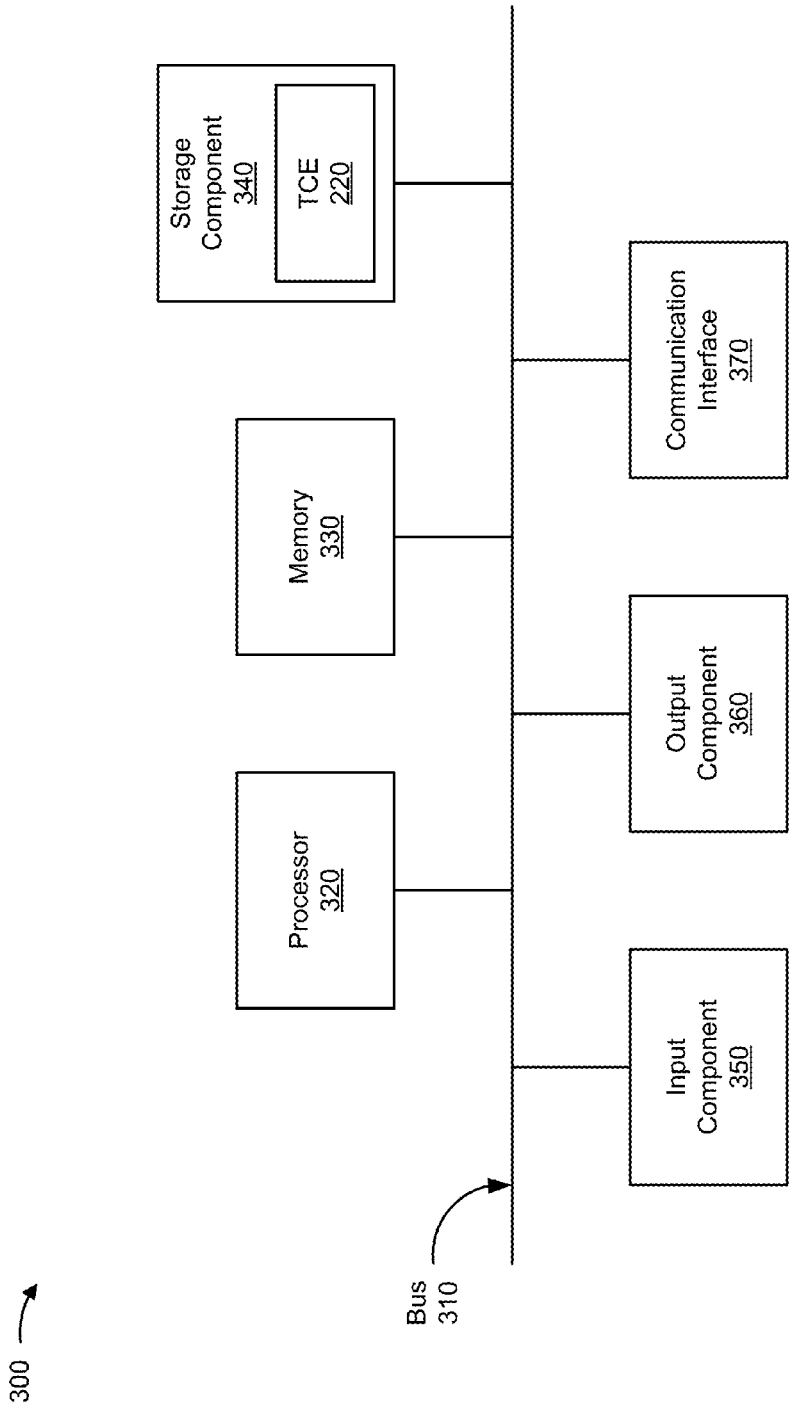
FIG. 3 is a diagram of example components of one or more devices of FIG. 2.

FIG. 3 is a diagram of example components of a device 300. Device 300 may correspond to client device 210 or server device 230. In some implementations, client device 210 and/or server device 230 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions, and/or that is designed to implement one or more computing tasks. In some implementations, processor 320 may include multiple processor cores for parallel computing. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive. In some implementations, storage component 340 may store TCE 220.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIGS. 4A-4I are diagrams of an example implementation 400 of applying, to a model, one or more modification techniques in order to generate program code, associated with the model, that satisfies a set of performance criteria. While example implementation 400 is described in terms of TCE 220 generating and executing program code in order to determine static profiling information and run-time profiling information for use in determining whether the set of performance criteria is satisfied, in some implementations, TCE 220 may determine profiling information in another manner without generating the program code or executing the program code, such as by generating simulated profiling information by executing the model, obtaining predicted profiling information using a prediction model associated with stored historical profiling information, or the like.

Figure 4A:
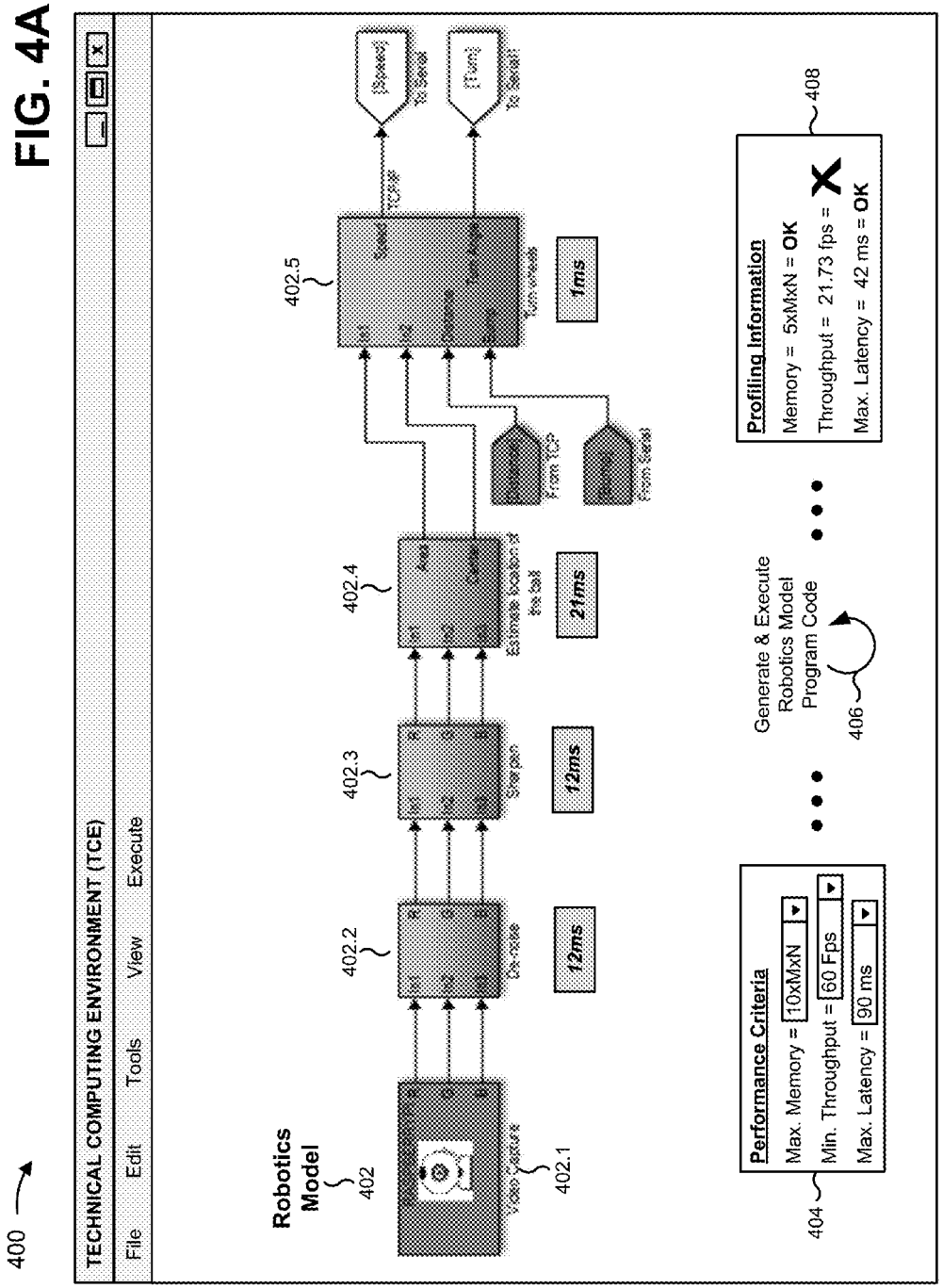

As shown in FIG. 4A, and by reference number 402, TCE 220 (e.g., hosted by client device 210) may receive information associated with a robotics model that uses captured video in order to track and follow a ball. As shown, robotics model 402 may include a group of subsystems including a video capture subsystem 402.1, a de-noise subsystem 402.2, a sharpen subsystem 402.3, an estimate ball location subsystem 402.4, and a turn wheels subsystem 402.5. For the purposes of example implementation 400, assume that a user wishes to generate program code for the robotics model that satisfies a set of performance criteria, and that TCE 220 receives (e.g., based on selection of a menu item, etc.) a command to generate the program code.

As shown by reference number 404, TCE 220 may determine, based on user input provided via a set of input elements included in a performance criteria user interface, the set of performance criteria associated with the program code to be generated from the model. As shown, the set of performance criteria may include information associated with a threshold amount (e.g., a maximum amount) of memory usage associated with the program code (e.g., 10×M×N, assuming that each color plane of the captured video image is a two dimensional matrix with size M×N and of data type uint8), a threshold amount of execution throughput associated with executing the program code (e.g., a minimum execution throughput of 60 frames per second (fps)), and a threshold amount of latency associated with executing the program code (e.g., a maximum latency of 90 milliseconds (ms)).

As shown by reference number 406, TCE 220 may generate program code, associated with robotics model 402, and may execute the program code. As shown by reference number 408, TCE 220 may determine (e.g., based on statically analyzing the program code before, after, and/or concurrently with executing the program code) static profiling information indicating that the robotics model program code requires 5×M×N of memory. As further shown, TCE 220 may determine (e.g., based on executing the program code) run-time profiling information indicating that the program code achieves an execution throughput of 21.73 fps and that the program code achieves a latency of 42 ms. As further shown, TCE 220 may determine an execution time for the program code corresponding to de-noise subsystem 402.2 (e.g., 12 ms), sharpen subsystem 402.3 (e.g., 12 ms), estimate ball location subsystem 402.4 (e.g., 21 ms), and turn wheels subsystem 402.5 (e.g., 1 ms). As also shown by reference number 408, TCE 220 may determine that the set of performance criteria is not satisfied (e.g., since the 60 fps minimum amount of throughput has not been achieved). For the purposes of example implementation 400, assume that TCE 220 is configured to apply modification techniques to robotics model 402 until a threshold quantity of modification techniques (e.g., 10) have been applied, until the set of performance criteria is satisfied, and/or until another threshold is satisfied (e.g., a maximum amount of time associated with modifying the model).

As shown in FIG. 4B, TCE 220 may identify (e.g., based on information stored by client device 210) a first modification technique, known to increase execution throughput, to be applied to robotics model 402. As shown, the first modification technique may include modifying implementation of an algorithm described by robotics model 402 (e.g., combining de-noise subsystem 402.2 and sharpen subsystem 402.3). As shown, TCE 220 may modify the algorithm by recognizing that the 2-D IFFT blocks, included in de-noise subsystem 402.2, and the 2-D FFT blocks, included in sharpen subsystem 402.3, may be removed (e.g., since the 2-D IFFTT operation and the 2-D FFT operations are inverses of one another). As shown by reference number 402.23, de-noise subsystem 402.2 and sharpen subsystem 402.3 may be combined into a single subsystem (e.g., de-noise & sharpen subsystem 402.23).

Figure 4C:
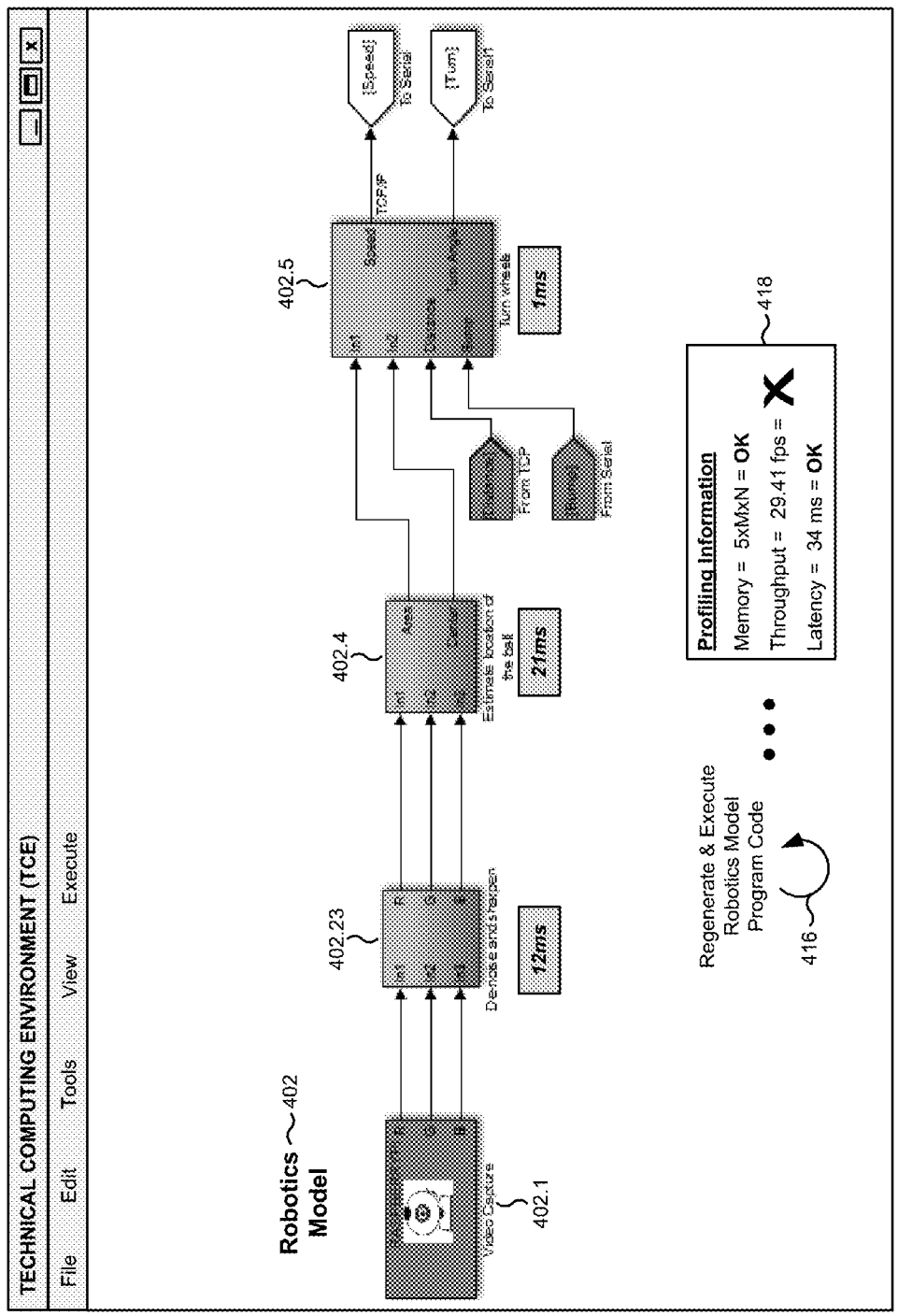

As shown in FIG. 4C, and by reference number 416, TCE 220 may regenerate program code, associated with modified robotics model 402, and may execute the regenerated program code. As shown by reference number 418, TCE 220 may determine (e.g., based on statically analyzing the regenerated program code) static profiling information indicating that the regenerated robotics model program code requires a predetermined amount, in this example, 5×M×N, of memory, and may determine (e.g., based on executing the program code) run-time profiling information indicating that the regenerated robotics model program code achieves an execution throughput of 29.41 fps and a latency of 34 ms. As further shown, TCE 220 may determine an execution time for program code corresponding to de-noise & sharpen subsystem 402.23 (e.g., 12 ms), estimate ball location subsystem 402.4 (e.g., 21 ms), and turn wheels subsystem 402.5 (e.g., 1 ms). As also shown by reference number 418, TCE 220 may determine that the set of performance criteria is not satisfied (e.g., since the 60 fps minimum amount of throughput has not been achieved). Moreover, since only one modification technique has been applied to robotics model 402 and since the set of performance criteria is not satisfied, TCE 220 may determine that robotics model 402 is to be further modified.

Figure 4D:
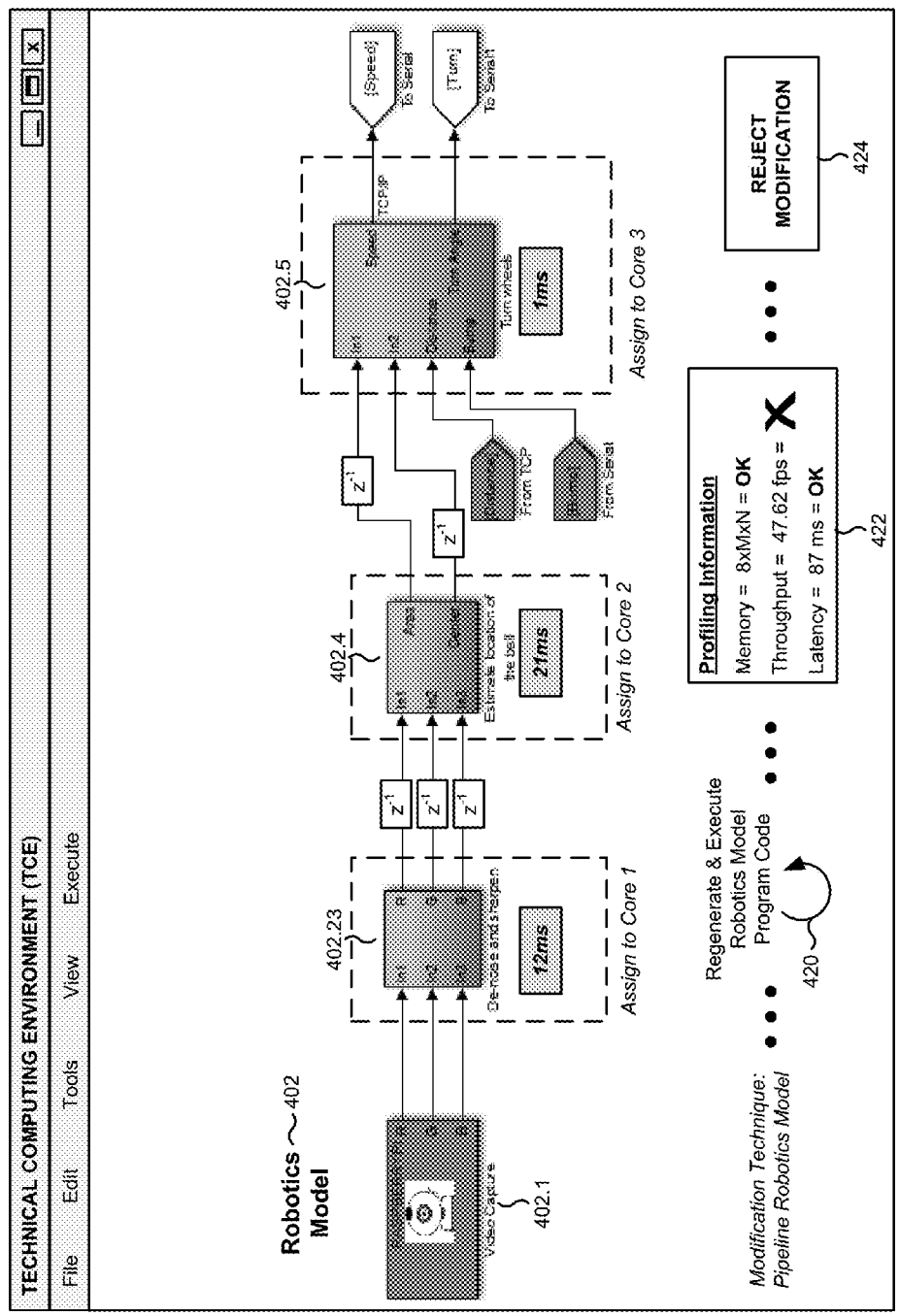

As shown in FIG. 4D, TCE 220 may identify (e.g., based on information stored by client device 210) a second modification technique, known to increase execution throughput, to be applied to the robotics model. As shown, the second modification technique may include pipelining robotics model 402 (e.g., such that program code associated with de-noise & sharpen subsystem 402.23, program code associated with estimate ball location subsystem 402.4, and program code associated with turn wheels subsystem 402.5 is concurrently executed on three different processor cores included in target hardware on which the program code is to be executed). As shown, TCE 220 may update a configuration of the model that causes program code corresponding to de-noise & sharpen subsystem 402.23 to be executed on a first processing core, program code corresponding to estimate ball location subsystem 402.4 to be executed on a second processing core, and program code corresponding to turn wheels subsystem 402.5 to be executed on a third processing core. As further shown, TCE 220 may further modify robotics model 402 to include a delay (e.g., represented by $z^{-1}$ blocks) between the subsystems of the model in order to implement the pipelining technique.

As shown by reference number 420, TCE 220 may regenerate and execute program code for modified robotics model 402. As shown by reference number 422, TCE 220 may determine (e.g., based on statically analyzing the regenerated program code) static profiling information indicating that the regenerated robotics model program code requires 8×M×N of memory (e.g., which increased due to the insertion of the delay blocks into the robotics model), and may determine (e.g., based on executing the program code) run-time profiling information indicating that the regenerated robotics model program code achieves an execution throughput of 47.62 fps and a maximum latency of 87 ms. As further shown, TCE 220 may determine an execution time for program code corresponding to de-noise & sharpen subsystem 402.23 (e.g., 12 ms), estimate ball location subsystem 402.4 (e.g., 21 ms), and turn wheels subsystem 402.5 (e.g., 1 ms). As further shown by reference number 422, TCE 220 may determine that the set of performance criteria is not satisfied (e.g., since the 60 fps minimum amount of throughput has not been achieved).

At this point, TCE 220 may determine, based on the execution time of estimate ball location subsystem 402.4, that the maximum throughput that may be achieved without modifying estimate ball location subsystem 402.4 is 47.62 fps (calculated by 1000 ms/s×1 frame/21 ms=47.62 fps). As shown by reference number 424, TCE 220 may determine that the execution time of estimate ball location subsystem 402.4 needs to be reduced before attempting other modification techniques, and TCE 220 may reject the second modification technique. In other words, TCE 220 may revert to the version of robotics model 402 created based on combining de-noise subsystem 402.2 and sharpen subsystem 402.3 using the first modification technique. Moreover, since only two modification techniques have been applied to the model and since the set of performance criteria is not satisfied, TCE 220 may determine that robotics model 402 is to be further modified.

As shown in FIG. 4E, and by reference number 426, TCE 220 may identify (e.g., based on information stored by client device 210, based on a user selection, based on analyzing robotics model 402) a third modification technique, known to increase execution throughput, to be applied to the robotics model. As shown, the third modification technique may include pipelining estimate ball location subsystem 402.4 of robotics model 402 (e.g., such that program code, associated with blocks included in the estimate ball location subsystem, is concurrently executed on the three different processor cores). TCE 220 may update a configuration of the model that causes program code corresponding to a first group of blocks of estimate ball location subsystem 402.4 to be executed on the first processing core, program code corresponding to a second group of blocks of estimate ball location subsystem 402.4 to be executed on the second processing core, and program code corresponding to a third group of blocks of estimate ball location subsystem 402.4 to be executed on the third processing core, as shown by reference numbers 402.4a, 402.4b, and 402.4c, respectively. As further shown, TCE 220 may further modify robotics model 402 to include a delay (e.g., represented by $z^{-1}$ blocks) between the groups of blocks of estimate ball location subsystem 402.4 in order to implement the pipelining technique.

Figure 4F:
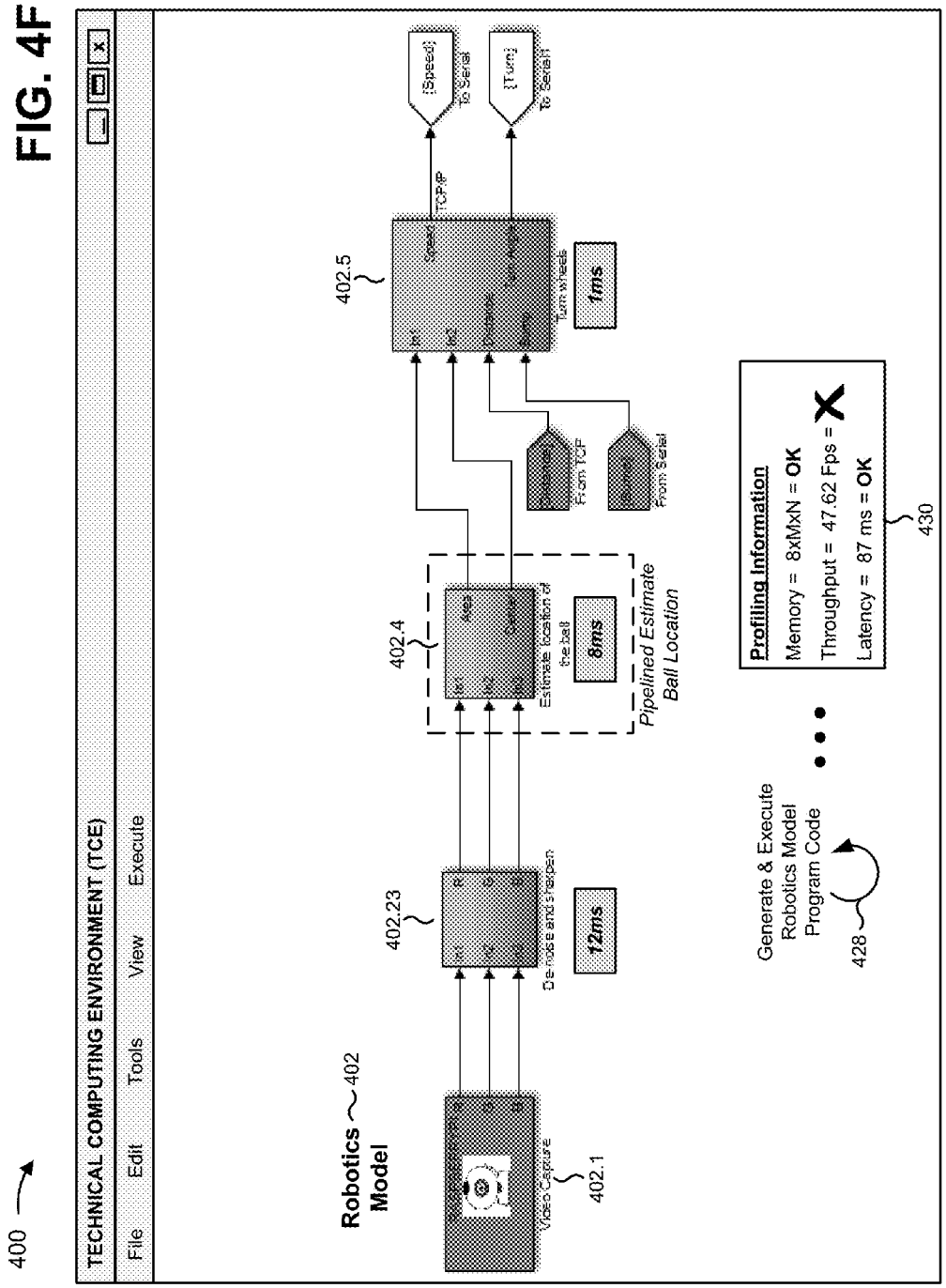

As shown in FIG. 4F, and by reference number 428, TCE 220 may regenerate and execute program code for modified robotics model 402. As shown by reference number 430, TCE 220 may determine (e.g., based on statically analyzing the regenerated program code) static profiling information indicating that the regenerated robotics model program code requires 8×M×N of memory (e.g., which increased due to the insertion of the delays in the estimate ball location subsystem). As further shown, TCE 220 may determine (e.g., based on executing the program code) run-time profiling information indicating that the regenerated robotics model program code achieves an execution throughput of 47.62 fps and a latency of 87 ms. As further shown, TCE 220 may determine an execution time for program code corresponding to de-noise & sharpen subsystem 402.23 (e.g., 12 ms), pipelined estimate ball location subsystem 402.4 (e.g., 8 ms), and turn wheels subsystem 402.5 (e.g., 1 ms). As further shown by reference number 430, TCE 220 may determine that the set of performance criteria is not satisfied (e.g., since the 60 fps amount of throughput has not been achieved). Moreover, since only three modification techniques have been applied to robotics model 402 and since the set of performance criteria is not satisfied, TCE 220 may determine that robotics model 402 is to be further modified.

Figure 4G:
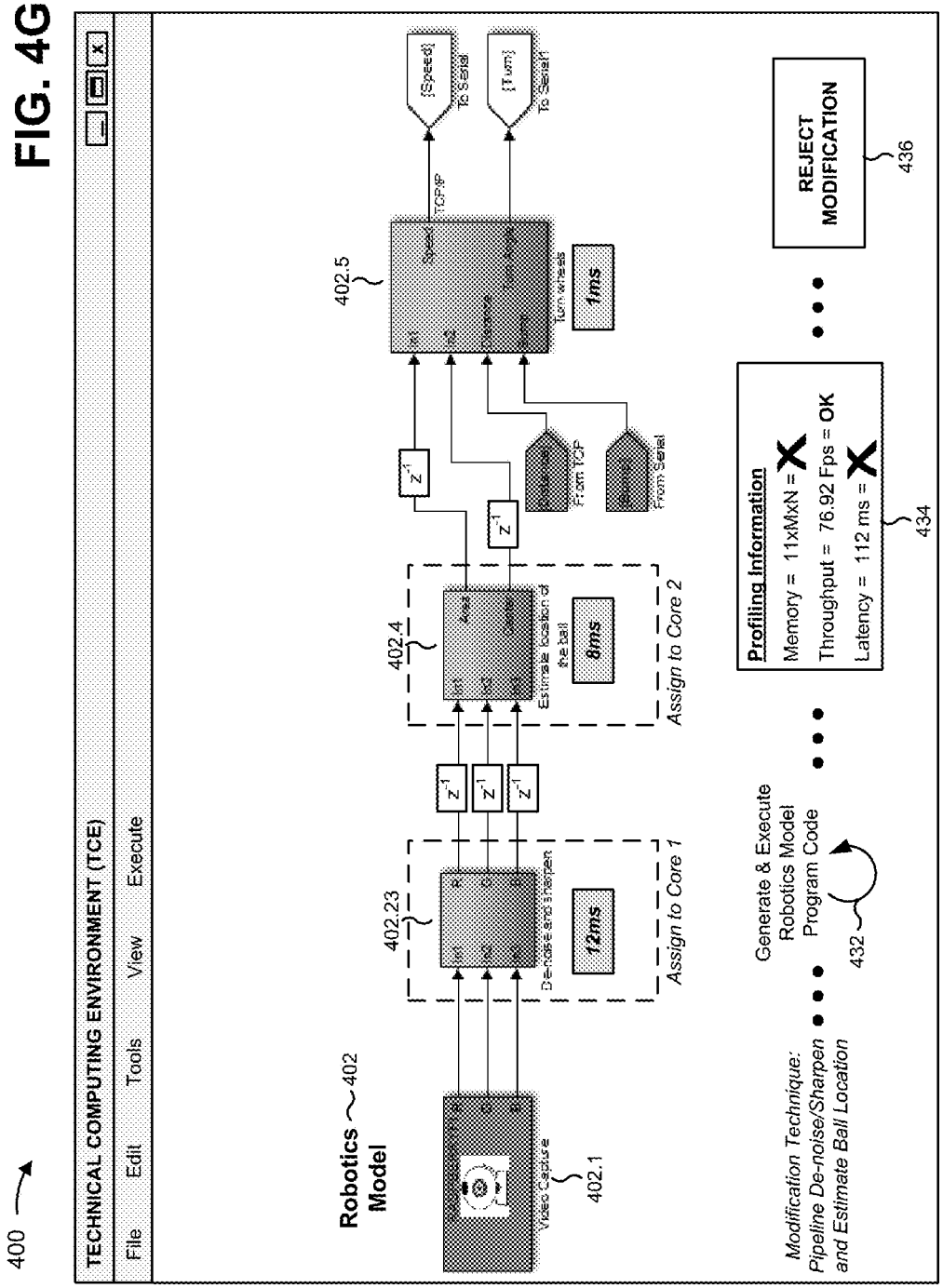

As shown in FIG. 4G, TCE 220 may identify (e.g., based on information stored by client device 210) a fourth modification technique, known to increase execution throughput, to be applied to robotics model 402. As shown, the fourth modification technique may include pipelining de-noise and sharpen subsystem 402.23 and estimate ball location subsystem 402.4 (e.g., such that program code associated with de-noise & sharpen subsystem 402.23 and program code associated with estimate ball location subsystem 402.4 are concurrently executed on two different processor cores). As shown, TCE 220 may update a configuration of robotics model 402 that causes program code corresponding to de-noise & sharpen subsystem 402.23 to be executed on the first processing core and program code corresponding to estimate ball location subsystem 402.4 to be executed on the second processing core. As further shown, TCE 220 may further modify robotics model 402 to include a delay (e.g., represented by $z^{-1}$ blocks) between the subsystems of robotics model 402 in order to implement the pipelining technique.

As shown by reference number 432, TCE 220 may regenerate and execute program code for modified robotics model 402. As shown by reference number 434, TCE 220 may determine (e.g., based on statically analyzing the regenerated program code) static profiling information indicating that the regenerated robotics model program code requires 11×M×N of memory (e.g., which increased due to the insertion of the delays), and may determine (e.g., based on executing the program code) run-time profiling information indicating that the regenerated robotics model program code achieves an execution throughput of 76.92 fps and a latency of 112 ms. As further shown, TCE 220 may determine an execution time for program code corresponding to de-noise & sharpen subsystem 402.23 (e.g., 12 ms), estimate ball location subsystem 402.4 (e.g., 8 ms), and turn wheels subsystem 402.5 (e.g., 1 ms). As shown, TCE 220 may determine that the set of performance criteria is not satisfied (e.g., since the 10×M×N amount of memory usage has been exceeded, and since the 90 ms maximum latency has been exceeded).

At this point, TCE 220 may determine that TCE 220 may not implement additional pipelining to robotics model 402, since each pipeline stage results in an additional 1-frame delay (e.g., 33 ms) to the latency achieved by executing the program code. As such, any additional pipelining would result in the 90 ms latency maximum being exceeded. Therefore, TCE 220 may reject the fourth modification technique. In other words, TCE 220 may revert to the version of robotics model 402 created based on pipelining estimate ball location subsystem 402.4 using the third modification technique. Moreover, since only four modification techniques have been applied to the model and since the set of performance criteria is not satisfied, TCE 220 may determine that robotics model 402 is to be further modified.

As shown in FIG. 4H, and by reference number 438, TCE 220 may identify (e.g., based on information stored by client device 210) a fifth modification technique, known to increase execution throughput, to be applied to robotics model 402. As shown, the fifth modification technique may include parallelizing de-noise & sharpen subsystem 402.23 of robotics model 402 (e.g., such that program code, associated with blocks included in de-noise & sharpen subsystem 402.23, is concurrently executed on the three different processor cores). TCE 220 may update a configuration of robotics model 402 that causes program code corresponding to a first group of blocks of de-noise & sharpen subsystem 402.23 to be executed on the first processing core, program code corresponding to a second group of blocks of de-noise & sharpen subsystem 402.23 to be executed on the second processing core, and program code corresponding to a third group of blocks of de-noise & sharpen subsystem 402.23 to be executed on the third processing core, as shown by reference numbers 402.23*a*, 402.23*b*, and 402.23*c*, respectively.

Figure 4I:
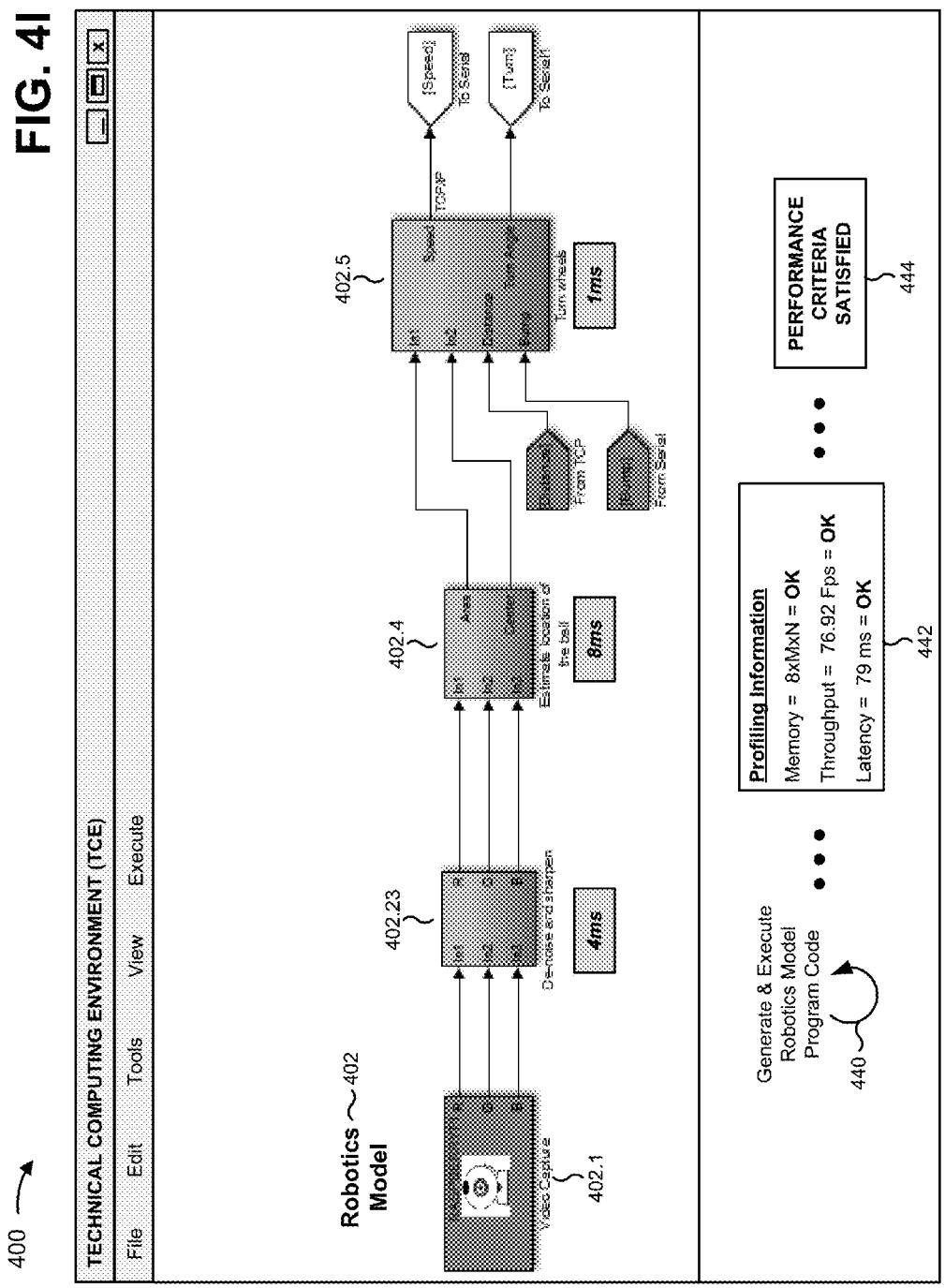

As shown in FIG. 4I, and by reference number 440, TCE 220 may regenerate and execute program code for modified robotics model 402. As shown by reference number 442, TCE 220 may determine (e.g., based on statically analyzing the regenerated program code) static profiling information indicating that the regenerated robotics model program code requires 8×M×N of memory, and may determine (e.g., based on executing the program code) run-time profiling information indicating that the regenerated robotics model program code achieves an execution throughput of 76.92 fps and a latency of 79 ms. As further shown, TCE 220 may determine an execution time for program code corresponding to de-noise & sharpen subsystem 402.23 (e.g., 4 ms), estimate ball location subsystem 402.4 (e.g., 8 ms), and turn wheels subsystem 402.5 (e.g., 1 ms). As shown by reference number, TCE 220 may determine that the set of performance criteria is satisfied, and may notify the user accordingly. TCE 220 may also store modified robotics model 402 and/or the regenerated program code that satisfies the set of performance criteria.

In this way, TCE 220 may apply, to robotics model 402, multiple modification techniques associated with a manner in which program code is generated from robotics model 402, may determine profiling information, associated with the program code, and may apply additional modification techniques until the program code, when regenerated, satisfies a set of performance criteria.

As indicated above, FIGS. 4A-4I are provided merely as an example. Other examples are possible and may differ from what was described with regard to FIGS. 4A-4I.

Figure 5:
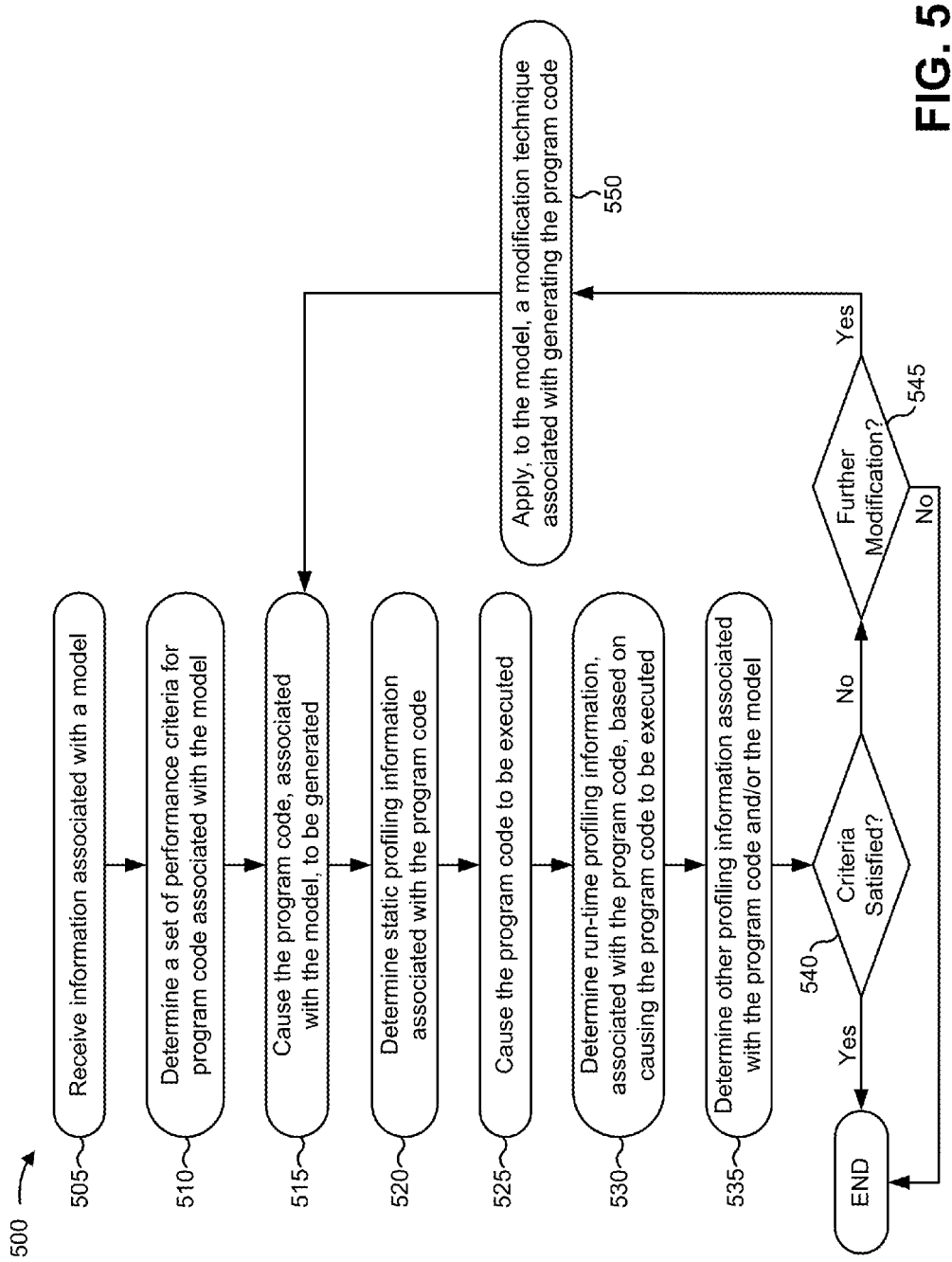
FIG. 5 is a flow chart of an example process for applying, to a model, one or more modification techniques in order to generate program code, associated with the model, that satisfies a set of performance criteria.

FIG. 5 is a flow chart of an example process 500 for applying, to a model, one or more modification techniques in order to generate program code, associated with the model, that satisfies a set of performance criteria. In some implementations, one or more process blocks of FIG. 5 may be performed by client device 210 (e.g., TCE 220). In some implementations, one or more process blocks of FIG. 5 may be performed by another device or a group of devices separate from or including client device 210, such as server device 230.

As shown in FIG. 5, process 500 may include receiving information associated with a model (block 505). For example, a user may cause client device 210 to create or open a user interface. The user interface (e.g., a model canvas) may not include any model blocks. The user may then add one or more blocks to the user interface to create the model. For example, in some implementations, client device 210 may receive a command, from the user, that indicates that a model block is to be added to the user interface. Client device 210 may receive the command based, for example, on detecting a selection of a particular menu item, entry of a particular textual or audible input from the user, and/or entry of some other predetermined input that indicates a desire to add a model block to the user interface. As another example, client device 210 may receive input (e.g., a drag and drop) that indicates that a model block, included in a block library associated with TCE 220, is to be added to the user interface. Based on the command, client device 210 may add the model block to the user interface. In some implementations, the model may include multiple model block. As another example, client device 210 (e.g., TCE 220) may receive a request, from a user of client device 210, to access a model that includes abstract nodes. The request may include information identifying the model, such as a name of the model, and information identifying a memory location at which the model is stored. The memory location may be located within client device 210 or external to, and possibly remote from, client device 210. Client device 210 may, based on receiving the request, retrieve the model from the memory location.

In some implementations, the information associated with the model may include information associated with one or more parameters associated with the model. For example, the information associated with the model may include one or more parameters that describe a manner in which the model is to run, operate, execute, etc. As another example, the information associated with the model may include one or more parameters that describe a manner in which program code is to be generated from the model, such as a code generation parameter associated with a block within a block of the model, a block of the model, a subsystem of the model, the model, or the like. As yet another example, the information associated with the model may include one or more parameters associated with a type of target hardware associated with the model (e.g., a type of processor on which program code, associated with the model, is to be executed).

As further shown in FIG. 5, process 500 may include determining a set of performance criteria for program code associated with the model (block 510). For example, client device 210 may determine a set of performance criteria for program code associated with the model. In some implementations, client device 210 may determine the set of performance criteria when a user provides information associated with the set of performance criteria. Additionally, or alternatively, client device 210 may determine the set of performance criteria when client device 210 receives the information associated with the model (e.g., when the information associated with the performance criteria is included in the information associated with the model).

In some implementations, the set of performance criteria may include information that identifies criteria associated with one or more performance metrics that are to be satisfied by program code generated from the model. For example, in some implementations, the set of performance criteria may include criteria associated with a threshold amount of execution throughput to be achieved when executing the program code, a threshold amount of CPU utilization to be achieved when executing the program code, a threshold amount of time required to produce an output based on generating the program code (e.g., 30 fps) for program code associated with a video output), or the like. In some implementations, multiple performance criteria may be associated with a single performance metric. Additionally, or alternatively, a single performance criteria may be associated with multiple performance metrics.

Additionally, or alternatively, the set of performance criteria may include criteria associated with a quantity of memory usage. For example, the set of performance criteria may include information associated with a threshold quantity of ROM that may be used by the program code, a threshold quantity of RAM that may be used when executing the program code, a threshold quantity of static memory that may be used by the program code, a threshold quantity of dynamic memory that may be used when executing the program code, or the like. Additionally, or alternatively, the set of performance criteria may include criteria associated with an amount of latency. For example, the set of performance criteria may include criteria associated with a threshold amount of time between system input and system output associated with executing the program code, a threshold amount of time between block input (e.g., a time at which input is received by a particular block that lies along a particular path, such as a critical path) and block output (e.g., a time at which output is provided by the particular block, or another block) associated with executing the program code, a threshold amount of I/O latency associated with executing the program code, or the like. Additionally, or alternatively, the set of performance criteria may include criteria associated with an amount of power usage associated with executing the program code. Additionally, or alternatively, the set of performance criteria may include criteria associated with an amount of I/O utilization to be achieved when executing the program code. Additionally, or alternatively, the set of performance criteria may include criteria associated with one or more other performance metrics. For example, the set of performance criteria may include any type of performance criteria, associated with the program code, that may be determined (e.g., measured, obtained, identified, detected, calculated, computed, etc.) by TCE 220 and/or any type of performance criteria, associated with usage of a resource associated with generating and/or executing the program code, whose utilization may be determined by TCE 220.

In some implementations, the set of performance criteria may be associated with a target processor with a single core (e.g., a threshold amount of power usage to be used when executing the program code on a single-core processor). Additionally, or alternatively, the set of performance criteria may be associated with a target processor with multiple cores (e.g., a threshold amount of execution throughput to be achieved when executing the program code on a multi-core processor). Additionally, or alternatively, the set of performance criteria may be associated with multiple target processors, each with a single core or multiple cores (e.g., a threshold quantity of memory usage to be satisfied when executing the program code on multiple target processors, which may be single core or multicore).

In some implementations, client device 210 may determine the set of performance criteria based on user input, an example of which is described above with regard to reference number 404 in FIG. 4A. For example, client device 210 may provide, for display to the user, a user interface associated with the set of performance criteria, and the user may provide (e.g., via a selection of a particular menu item, entry of a particular textual or audible input, etc.) information associated with the set of performance criteria. Additionally, or alternatively, client device 210 may determine the set of performance criteria based on information associated with the model. For example, client device 210 may receive the model, including information that identifies target hardware associated with the model (e.g., a single-core processor, a multi-core processor, multiple processors, etc.), and client device 210 may determine the set of performance criteria based on a set of performance criteria, stored or accessible by client device 210, and that corresponds to the target hardware (e.g., a set of performance constraints associated with the target processor).

In some implementations, client device 210 may determine a set of weights associated with the set of performance criteria. For example, client device 210 may determine a set of performance criteria that includes first performance criteria associated with a first performance metric and second performance criteria associated with a second performance metric. In this example, client device 210 may also determine a first weight, corresponding to the first performance criteria, and a second weight corresponding to the second performance criteria. In this example, client device 210 may determine that the first performance criteria is more important than the second performance criteria (e.g., when the first weight is greater than the second weight, when the first weight is a value that is two times greater than a value of the second weight, etc.). In some implementations, client device 210 may consider the set of weights when determining whether the set of performance criteria is satisfied. For example, client device 210 may assign a greater penalty, associated with determining whether the set of performance criteria is satisfied, when the program code fails to meet the first performance criteria as compared to a penalty assigned when the program code fails to meet the second performance criteria. In some implementations, client device 210 may determine the set of weights based on user input (e.g., when the user specifies the set of weights via a user interface of client device 210). Additionally, or alternatively, client device 210 may (e.g., automatically) determine the set of weights based on information associated with the model (e.g., client device 210 may determine the set of weights for the set of performance criteria when the user provides high level weight information associated with the set of performance criteria). Additionally, or alternatively, client device 210 may determine the set of weights based on information stored by client device 210 (e.g., when client device 210 stores information associated with default weights associated with corresponding performance criteria).

As further shown in FIG. 5, process 500 may include causing the program code, associated with the model, to be generated (block 515). For example, client device 210 may cause the program code, associated with the model, to be generated. In some implementations, client device 210 may cause the program code to be generated based on a command from the user. For example, the user may indicate (e.g., via selection of a particular menu item, etc.) that client device 210 is to determine whether program code generated from the model satisfies a set of performance criteria, and client device 210 may cause the program code to be generated based on receiving the command. Additionally, or alternatively, client device 210 may cause the program code to be generated when client device 210 determines the set of performance criteria for the program code. Additionally, or alternatively, client device 210 may cause the program code to be generated after client device 210 receives the information associated with the model.

In some implementations, client device 210 may cause the program code to be generated using a code generation module of TCE 220, an example of which is described above with regard to reference numbers 406, 416, 420, 428, and 432 in FIGS. 4A, 4C, 4D, 4F, and 4G, respectively. For example, TCE 220 may include a code generation module capable of generating program code (e.g., C program code, Hardware Description Language (HDL) code, very-high-speed integrated circuits (VHSIC) HDL (VHDL) code, Verilog code, Java code C++ program code, etc.) for execution on target hardware (e.g., a particular type of single-core processor, a particular type of multi-core processor, a particular type of an embedded processor, multiple types of processors, etc.).

In some implementations, client device 210 may cause the program code to be generated by generating the program code (e.g., using a code generation module associated with TCE 220). For example, client device 210 may generate the program code when client device 210 hosts TCE 220. Additionally, or alternatively, client device 210 may cause the program code to be generated by another device. For example, client device 210 may cause the program code to be generated by server device 230 (e.g., when server device 230 hosts TCE 220). In some implementations, the program code may be generated in accordance with one or more code generation parameters, associated with the model, that describe a manner in which the program code is to be generated.

As further shown in FIG. 5, process 500 may include determining static profiling information associated with the program code (block 520). For example, client device 210 may determine static profiling information associated with the program code. In some implementations, client device 210 may determine the static profiling information associated with the program code after client device 210 causes the program code to be generated. Additionally, or alternatively, client device 210 may determine the static profiling information when client device 210 receives a command indicating that client device 210 is to determine the static profiling information.

Static profiling information may include information associated with one or more performance metrics, associated with the program code generated from the model, that may be determined without executing the program code. For example, the static profiling information may include information associated with a quantity of memory usage in terms of RAM, ROM, stack size, or the like. In some implementations, client device 210 may determine the static profiling information based on performing a static analysis of the program code, an example of which is described above with regard to reference numbers 408, 418, 422, 430, and 434 in FIGS. 4A, 4C, 4D, 4F, and 4G, respectively. A static code analysis may include a verification activity that analyzes the program code for quality and reliability. In some implementations, the static code analysis may provide static profiling information associated with a code quality metric, such as counting a quantity of lines of code, determining comment density, assessing code complexity, or the like. Additionally, or alternatively, the static code analysis may provide static profiling information associated with verifying compliance to a particular coding standard. Additionally, or alternatively, the static analysis may include applying one or more abstraction techniques (e.g., abstract interpretation, model checking, satisfiability solving, etc.) in order to determine the static profiling information. In some implementations, client device 210 may determine whether the set of performance criteria is satisfied based on the static profiling information, as described below, in order to determine whether client device 210 is to apply a modification technique to the model.

As further shown in FIG. 5, process 500 may include causing the program code to be executed (block 525). For example, client device 210 may cause the program code to be executed. In some implementations, client device 210 may cause the program code to be executed after client device 210 causes the program code to be generated. Additionally, or alternatively, client device 210 may cause the program code to be executed when client device 210 determines the static profiling information associated with the program code.

In some implementations, client device 210 may cause the program code to be executed by executing the program code, an example of which is described above with regard to reference numbers 406, 416, 420, 428, and 432 in FIGS. 4A, 4C, 4D, 4F, and 4G, respectively. For example, client device 210 may execute the program code on a target processor associated with client device 210. Additionally, or alternatively, client device 210 may cause the program code to be executed by another device. For example, client device 210 may cause the program code to be executed by a target processor associated with server device 230.

In some implementations, client device 210 may cause the program code to be executed based on a test vector determined by client device 210. Additional details regarding determining a test vector are described below with regard to FIG. 6.

As further shown in FIG. 5, process 500 may include determining run-time profiling information, associated with the program code, based on causing the program code to be executed (block 530). For example, client device 210 may determine run-time profiling information, associated with the program code, based on causing the program code to be executed, an example of which is described above with regard to reference numbers 408, 418, 422, 430, and 434 in FIGS. 4A, 4C, 4D, 4F, and 4G, respectively. In some implementations, client device 210 may determine the run-time profiling information when client device 210 causes the program code to be executed (e.g., while the program code is being executed, after the program code is executed, etc.).

Run-time profiling information may include information associated with one or more performance metrics that are measured during the execution of the program code. For example, the run-time profiling information may include information associated with an amount of execution throughput achieved during execution of the program code, such as an amount of CPU utilization per processor core, an amount of CPU utilization per block, per model, per subsystem, etc., timing information associated with an output (e.g., fps of output for a video application), or the like. As another example, the run-time profiling information may include information associated with a quantity of memory usage associated with executing the program code (e.g., per processor core, per model, per subsystem, per block, etc.), a quantity of RAM used during execution (e.g., per processor core, per model, per subsystem, per block, etc.), a quantity of static memory used during execution, a quantity of dynamic memory used during execution, or the like. As yet another example, the run-time profiling information may include information associated with an amount of latency associated with executing the program code, such as information associated with an amount of time between system input and system output, block input and block output, an I/O latency, or the like. As still another example, the run-time profiling information may include information associated with an amount of power usage associated with executing the program code, such as an actual power measurement, a heat measurement, a three-phase power estimate, or the like. As a final example, the run-time profiling information may include information associated with I/O utilization associated with executing the program code, such as a bus utilization measurement, a network loading measurement, or the like. Additionally, or alternatively, the run-time profiling information may include information associated with another type of performance metric that may be measured and/or inferred by client device 210.

In some implementations, client device 210 may determine the run-time profiling information based on a tic/toc timer measurement. Additionally, or alternatively, client device 210 may determine the run-time profiling information based on a hardware performance counter (e.g., a special-purpose registers built into a microprocessors and configured to store counts of hardware related activities within a computer system).

As further shown in FIG. 5, process 500 may include determining other profiling information associated with the program code and/or the model (block 535). For example, client device 210 may determine other profiling information associated with the program code and/or the model. In some implementations, client device 210 may determine the other profiling information when client device 210 receives the information associated with the model. Additionally, or alternatively, client device 210 may determine the other profiling information when (e.g., before, after, concurrently with, etc.) client device 210 determines the static profiling information and/or the run-time profiling information associated with the program code. Additionally, or alternatively, client device 210 may determine the other profiling information when client device 210 receives information indicating that client device 210 is to determine the other profiling information.

In some implementations, the other profiling information may include predicted profiling information associated with the program code. For example, client device 210 may determine static profile and/or run-time profiling information associated with first program code generated for the model, and may apply a modification technique to the model after comparing the profiling information to the set of performance criteria (e.g., as described below). In this example, client device 210 may store the profiling information associated with the first program code, and may generate second program code for the model. Here, client device 210 may, based on the profiling information associated with the first program code, predict profiling information associated with the second program code.

As a specific example, assume that a model includes a pair of subsystems including a 32-bit subsystem (e.g., a subsystem that performs 32-bit arithmetic operations) and a 16-bit subsystem (e.g., a subsystem that performs 16-bit arithmetic operations). In this example, client device 210 may generate program code for the model and cause the program code to be executed (e.g., on a 16-bit device). Here, assume that dynamic profiling information, determined as a result of executing the program code, identifies an average execution time for the 16-bit subsystem as 0.175 seconds, an average self time for the 16-bit subsystem as 0.084 seconds, an average execution time for the 32-bit subsystem as 0.292 seconds, and an average self time for the 32-bit subsystem as 0.190 seconds. Notably, the times for the 16-bit subsystem are approximately equal to half of the times associated with the 32-bit subsystem. Based on the dynamic profiling information associated with executing the program code, client device 210 may then determine predicted profiling information associated with converting the 32-bit subsystem to perform 16-bit operations (e.g., client device 210 may predicted how much execution performance gain may be achieved without modifying the model and/or regenerating program code). In such an example, client device 210 may also determine whether client device 210 is permitted to perform a conversion to a different integer size representation (e.g., based on analyzing a range of input data, based on user input, etc.).

In some implementations, client device 210 may determine the predicted profiling information based on applying a machine learning technique associated with storing profiling information from an earlier execution of the program code and/or analysis of the program code, as described in the above example. This may allow client device 210 to predict profiling information for another model and/or for the same model with a different set of parameters (e.g., after a modification technique is applied to a portion of the model). As an example, assume that client device 210 stores information indicating that replacing a multiply function with an intrinsic multiple function for a particular processor allows for a 20% improvement in execution throughput. Also, assume that client device 210 stores information indicating that the cost of using double-precision floating-point format for one or more functions is 40% higher for a particular type of processor (e.g., in terms of a particular computing resource) versus using single-precision floating-point format for the one or more functions. Client device 210 may determine this information based on an execution of one or more previous versions of the program code on the target processor, based on an execution of program code associated with another model on the target processor, based on datasheet information provided by a manufactured of the target processor, or the like. In some implementations, client device 210 may execute a script (e.g., a seeding script) designed to investigate a list of modification techniques for the target processor (e.g., a list determined based on stored profiling information), and client device 210 may determine predicted profiling information in the form of a predicted change in one or more performance metrics that may result if one or more of the modification techniques are applied to the model. Here, client device 210 may determine the predicted profiling information for the model and/or program code generated from the model if client device 210 were to apply one or more of the modification techniques. In some implementations, the predicted profiling information may be displayed to the user on the model canvas, for example, to guide the user through making a decision on which modification techniques to apply to the model.

Additionally, or alternatively, the other profiling information may include simulated profiling information associated with the model. For example, client device 210 may determine simulated profiling information based on a result of executing the model in order to perform a simulation. In other words, client device 210 may determine simulated profiling information by executing the model without generating and/or executing the program code associated with the model.

In some implementations, client device 210 may provide, for display to the user, the static profiling information, the run-time profiling information, the predicted profiling information, and/or the simulated profiling information.

As further shown in FIG. 5, process 500 may include determining, based on the static profiling information, the run-time profiling information, and/or the other profiling information, whether the set of performance criteria is satisfied (block 540). For example, client device 210 may determine whether the set of performance criteria is satisfied. In some implementations, client device 210 may determine whether the set of performance criteria is satisfied after client device 210 determines the static profiling information, the run-time profiling information, and/or the other profiling information. Additionally, or alternatively, client device 210 may determine whether the set of performance criteria is satisfied when client device 210 receives information indicating that client device 210 is to determine whether the set of performance criteria is satisfied.

In some implementations, client device 210 may determine whether the set of performance criteria is satisfied based on comparing the set of performance criteria and the profiling information (e.g., the static profiling information, the run-time profiling information, the predicted profiling information, the simulated profiling information, etc.), an example of which is described above with regard to reference numbers 408, 418, 422, 430, and 434 in FIGS. 4A, 4C, 4D, 4F, and 4G, respectively. For example, assume that client device 210 determines a set of performance criteria that identifies a threshold amount (e.g., a maximum amount) of memory that may be used by the program code, a threshold amount (e.g., a minimum amount) of execution throughput associated with executing the program code, and a threshold amount (e.g., a maximum amount) of latency allowable when executing the program code. In this example, client device 210 may determine static profiling information that identifies a quantity of memory usage associated with the program code, and run-time profiling information that identifies an amount of execution throughput, associated with executing the program code, and an amount of latency associated with executing the program code. Here, client device 210 may compare the set of performance criteria to the profiling information, and may determine whether the set of performance criteria is satisfied.

Continuing with this example, if one or more of the thresholds, associated with the set of performance criteria, are not satisfied (e.g., when the amount of memory usage is greater than the memory threshold, the amount of execution throughput is less than the execution throughput threshold, and/or the amount of latency is greater than the latency threshold), then client device 210 may determine that the set of performance criteria is not satisfied. Alternatively, if each of the thresholds is satisfied (e.g., when the amount of memory usage is less than or equal to the memory threshold, the amount of execution throughput is greater than or equal to the execution throughput threshold, and the amount of latency is less than or equal to the latency threshold), then client device 210 may determine that the set of performance criteria is satisfied.

In some implementations, client device 210 may provide, for display to the user, information indicating whether the set of performance criteria is satisfied. For example, client device 210 may provide, for display, information that identifies a performance metric, associated with the set of performance criteria, that is satisfied, information that identifies a performance metric that is not satisfied, profiling information associated with one or more performance metrics that do or do not satisfy the performance criteria, and/or another type of information.

As further shown in FIG. 5, if the set of performance criteria is satisfied (block 540—YES), then process 500 may include ceasing further modification of the model. For example, client device 210 may determine that the set of performance criteria is satisfied, and client device 210 may cease further modification of the model.

In some implementations, client device 210 may provide, for display to the user, an indication that the set of performance criteria is satisfied. Additionally, or alternatively, client device 210 may store and/or provide the model and/or the program code. Additionally, or alternatively, client device 210 may store and/or provide the static profiling information and/or the run-time profiling information such that client device 210 may determine predicted profiling information at a later time (e.g., for another model, for the same model with another set of parameters, etc.).

As further shown in FIG. 5, if the set of performance criteria is not satisfied (block 540—NO), then process 500 may include determining whether the model is to be further modified (block 545). For example, client device 210 may determine that the set of performance criteria is not satisfied, and client device 210 may determine whether client device 210 is to further modify the model.

In some implementations, client device 210 may determine whether the model is to be further modified based on a modification threshold, an example of which is described above with regard to FIGS. 4A, 4C, 4D, 4F, and 4G, respectively. For example, client device 210 may store information that identifies a maximum quantity of modification techniques (e.g., 5, 10, 20), that may be applied to the model. In this example, client device 210 may track the quantity of modification techniques applied to the model (i.e., the number of times process 500 is repeated on the model), and client device 210 may determine whether the model is to be further modified based on the modification threshold. Here, client device 210 may cease applying modification techniques to the model when the modification threshold is satisfied (e.g., even when the set of performance criteria is not satisfied). As another example, client device 210 may store information that identifies a maximum amount of time (e.g., 30 seconds, five minutes, etc.) during which modification techniques may be applied to the model.

Additionally, or alternatively, client device 210 may determine whether the model is to be further modified based on whether a modification technique that has yet to be applied to the model. For example, client device 210 may track whether each modification technique, available to client device 210, has been applied to the model, and may determine that client device 210 is to be further modified based on whether client device 210 has exhausted a group of modification techniques (e.g., all available modification techniques, a subset of available modification techniques, etc.).

Additionally, or alternatively, client device 210 may determine whether the model is to be further modified based on user input. For example, the user may provide (e.g., via a selection of a menu item, by clicking on a button, etc.) user input associated with whether the model is to be further modified, and client device 210 may determine whether the model is to be further modified based on the user input. In this example, the user may also select a modification technique that is to be applied.

As further shown in FIG. 5, if the model is not to be further modified (block 545—NO), then process 500 may include ceasing further modification of the model. For example, client device 210 may determine that the model is not to be further modified, and client device 210 may cease further modification of the model. In some implementations, client device 210 may provide, for display to the user, an indication that the model is not to be further modified and/or information indicating that the set of performance criteria is not satisfied.

As further shown in FIG. 5, if the model is to be further modified (block 545—YES), then process 500 may include applying, to the model, a modification technique associated with generating the program code (block 550). For example, client device 210 may determine that the model is to be further modified, and client device 210 may apply, to the model, a modification technique associated with generating the program code.

A modification technique may include a technique associated with modifying a model and/or a parameter of the model, such that program code, generated from the model, satisfies a set of performance criteria (e.g., when statically profiled, when profiled during execution, etc.). In some implementations, the modification technique may be associated with an attribute of the generated code that may be varied to control resource usage when executing the generated code. In other words, the modification technique may be used to direct the generated code towards the desired set of performance criteria.

For example, the modification technique may include a technique associated with modifying selection of an I/O interface (e.g., interface selection for inter-process communications, inter-device communications, accessing shared memory, etc.), partitioning execution of the program code in multiple threads, modifying generation and/or construction of an intermediate representation (IR) associated with the program code, modifying generation of the program code (e.g., loop unrolling, constant folding, etc.), selecting a code replacement library (CRL), implementing single instruction multiple data (SIMD), pipelining the model from which the program code is generated, modifying implementation of an algorithm described by the model, implementing an in-place memory algorithm, implementing buffer reuse, implementing use of reusable functions, implementing the use of inline functions, modifying compiler settings (e.g., selecting a compiler release, selecting a compiler debug method, selecting a compiler optimization, etc.), modifying a manner in which memory is managed (e.g., improving proximity for cache performance, use of near JMPs, use of far JMPs, modifying a memory stack size and/or a memory heap size, modifying allocation of static memory, modifying allocation of dynamic memory, etc.), modifying processing core affinity associated with executing the program code, modifying program code scheduling (e.g., selecting a scheduling scheme, selecting an operating system, identifying a task priority and/or a thread priority, etc.), implementing use of passing variables by reference, implementing use of passing variables by pointer, parallelizing execution of the program code across multiple processors, parallelizing executing of the program code across multiple cores of a single processors, or another type of technique associated with modifying the model and/or a manner in which program code is generated from the model.

In some implementations, client device 210 may identify the modification technique that is to be applied to the model based on the profiling information and the set of performance criteria. For example, assume that client device 210 determines, based on profiling information, associated with the model and/or the program code, that the set of performance criteria is not satisfied (e.g., that a quantity of memory usage is greater than a maximum memory usage threshold). In this example, client device 210 may identify the modification technique as a modification technique associated with reducing the quantity of memory usage. In other words, client device 210 may store and/or have access to information (e.g., a machine learning model associated with selecting a modification technique, information that allows client device 210 to perform an interpolation associated with selecting a modification technique, information that allows client device 210 to perform an extrapolation associated with selecting a modification technique, etc.) that allows client device 210 to select a modification technique. In some implementations, client device 210 may identify the modification technique based on the set of performance criteria. For example, assume that the set of performance criteria includes first performance criteria associated with a first performance metric, second performance criteria associated with a second performance metric, and third performance criteria associated with a third performance metric. Further assume that client device 210 determines, based on profiling information, that the first performance criteria is satisfied, and that the second performance criteria and the third performance criteria are not satisfied. In this example client device 210 may identify the modification technique as a technique that may cause the second and/or the third performance criteria to be satisfied, without causing the first performance criteria to not be satisfied.

For example, a first modification technique may increase performance in terms of the second performance criteria, but may decrease performance in terms of the third performance criteria and the first performance criteria. In this case, client device 210 may not identify the first modification technique for application to the model. As another example, a second modification technique may increase performance in terms of the second performance criteria and performance in terms of the third performance criteria, and may have a negligible effect on performance in terms of the first performance criteria. In this case, client device 210 may identify the second modification technique for application to the model. In this way, client device 210 may consider multiple performance criteria when identifying the modification technique (rather than identifying the modification technique based on a single performance criteria). Additionally, or alternatively, client device 210 may select a modification technique in another manner, such as based on user selection of a particular modification technique.

In some implementations, client device 210 may apply the modification technique to the model (e.g., a model wide modification). Alternatively, client device 210 may apply the modification technique to a portion of the model. For example, client device 210 may apply the modification technique to a block within a block of the model, a block of the model, a group of blocks of the model, a subsystem of the model, a group of subsystems of the model, or the like. In other words, client device 210 may apply the modification technique at any level of granularity (as opposed to applying a model wide modification). In some implementations, applying the modification technique to a portion of the model may cause a portion of the program code, when regenerated after applying the modification technique and corresponding to the portion of the model, to be modified. In other words, applying the modification technique to only a portion of the model may allow a manner in which program code is generated for the portion to be modified (rather than modifying a manner in which program code is generated for the entire model).

In some implementations, the modification technique may be associated with a portion of the model and/or the program code that lies on a critical path. For example, as described below, client device 210 may identify a critical path (e.g., an execution throughput critical path, a memory usage critical path, a power usage critical path, etc.) associated with the program code, and client device 210 may apply the modification to a portion of the model that lies on the critical path (e.g., in order to improve performance associated with the critical path). Additional details regarding application of the modification technique to the critical path are described below with regard to FIG. 6.

In some implementations, client device 210 may display, to the user, information associated with the modification technique to be applied to the model. For example, client device 210 may display (e.g., within a pop-up window, on the model canvas, etc.) information (e.g., textual information, graphical information, etc.) that identifies the portion of the model to which the modification technique is to be applied. In some implementations, the user may be prompted whether or not the modification technique is to be applied to the portion of the model. For example, the user may be prompted to approve or disapprove a modification associated with the modification technique, modify the application of the modification technique, etc.

In some implementations, client device 210 may identify the modification technique to be applied to the model. For example, client device 210 may identify the modification technique based on user input, such as a user selection of the modification technique. As another example, client device 210 may identify the modification technique based on selection criteria (e.g., when a first modification technique must be applied before a second modification technique, etc.). In some implementations, client device 210 may identify the modification technique based on information associated with the model. For example, client device 210 may analyze one or more blocks of the model in order to identify the modification technique. As another example, client device 210 may identify the modification technique based on information associated with a previous modification technique that was applied to the model.

In some implementations, client device 210 may reject the modification technique after applying the modification technique. For example, client device 210 may reject the modification technique (e.g., and restore a previous version of the model), when the modification technique causes a performance criteria, of the set of performance criteria, to not be satisfied, an example of which is described above with regard to reference numbers 424 and 436 in FIGS. 4D and 4G, respectively. Additionally, or alternatively, client device 210 may reject the modification technique based on a numerical behavior associated with the modified model. For example, client device 210 may determine (e.g., based on a default configuration, based on user input, etc.) a numerical tolerance that identifies an acceptable divergence of numerical behavior between the model and the modified model. Here, when client device 210 applies the modification technique to the model, client device 210 may also determine the numerical behavior of the modified model (e.g., associated with the regenerated program code) to make sure that the numerical behavior does not diverge in excess of the numerical tolerance. In a case where the numerical tolerance is exceeded, client device 210 may reject the modification technique that caused the numerical tolerance to be exceeded.

In some implementations, after applying the modification technique, client device 210 may cause the program code, associated with the model, to be regenerated (process 500 may return to block 515), and may determine profiling information associated with the regenerated program code. In this way, client device 210 may apply multiple modification techniques to the model in order to generate program code that satisfies the set of performance criteria.

In some implementations, client device 210 may revert to a previous version of the model after applying the modification technique. For example, assume that client device 210 applies, to a first version of a model, a first modification technique that results in a second version of the model. Here, assume that program code generated from the second version of the model provides a degraded performance (e.g., in terms of execution throughput, memory usage, power usage, etc.) as compared to program code generated from the first version of the model and/or a performance that cannot be further improved with respect to a particular performance metric. In this example, client device 210 may revert (e.g., based on information stored by client device 210) to the first version of the model, and may apply a different modification technique to the first version of the model. In other words, in some implementations, client device 210 may discard a modification resulting from application of a modification technique, and may proceed with applying another modification technique.

In this way, client device 210 (e.g., TCE 220) may apply, to a model, one or more modification techniques associated with a manner in which program code is generated from the model. Client device 210 may then determine profiling information (e.g., static profiling information, predicted profiling information, simulated profiling information, run-time profiling information, etc.), associated with the program code, and may apply additional modification techniques such that the program code, when regenerated, satisfies a set of performance criteria (or is improved with respect to the performance criteria when the set of performance criteria is not satisfied based on modifying the model). As a result, client device 210 may improve the generation of models.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
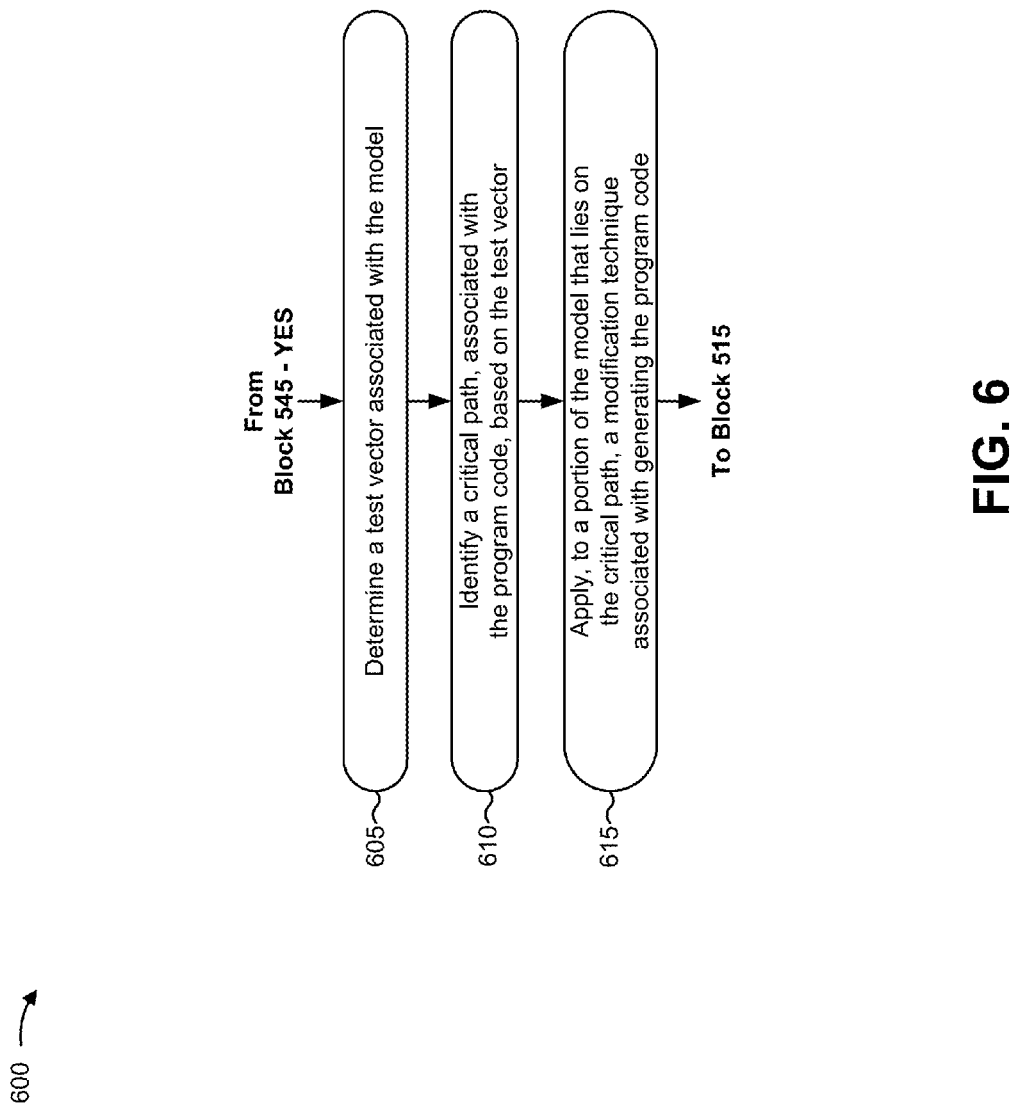
FIG. 6 is a flow chart of an example process for applying modification technique to a portion of a model that lies on a critical path.

FIG. 6 is a flow chart of an example process 600 for applying a modification technique to a portion of a model that lies on a critical path. Process 600 may be related to block 550 of FIG. 5. In some implementations, one or more process blocks of FIG. 6 may be performed by client device 210 (e.g., TCE 220). In some implementations, one or more process blocks of FIG. 6 may be performed by another device or a group of devices separate from or including client device 210, such as server device 230.

As shown in FIG. 6, process 600 may include determining a test vector associated with the model (block 605). For example, client device 210 may determine a test vector associated with the model. In some implementations, client device 210 may determine the test vector, associated with the model, before client device 210 causes the program code to be executed (e.g., such that the program code may be executed based on the test vector). Additionally, or alternatively, client device 210 may determine the test vector after client device 210 determines that the model is to be further modified (e.g., client device 210 may determine the test vector after client device 210 determines that the set of performance criteria is not satisfied).

A test vector may include information associated with a set of inputs that may be used to test the program code generated from the model in order to identify a critical path. In some implementations, client device 210 may determine the test vector based on the model and/or the program code generated from the model. For example, client device 210 (e.g., TCE 220) may host a model coverage module capable of determining one or more test vectors that, when used to test the program code, reach a threshold amount of model coverage (e.g., 75%, 100%, etc.). Additionally, or alternatively, client device 210 may determine the test vector based on user input. For example, the user may provide, via TCE 220, information associated with the test vector. In some implementations, client device 210 may determine multiple test vectors.

As further shown in FIG. 6, process 600 may include identifying a critical path, associated with the program code, based on the test vector (block 610). For example, client device 210 may identify a critical path, associated with the program code, based on the test vector. In some implementations, client device 210 may identify the critical path, associated with the program code, after client device 210 executes the program code based on the test vector. Additionally, or alternatively, client device 210 may identify the critical path when client device 210 receives information indicating that client device 210 is to identify the critical path.

A critical path may include a sequence of tasks (e.g., associated with program code that corresponds to one or more blocks of the model) that must be performed in order to complete an execution of the program code based on a test vector. A task on the critical path may not begin until a preceding task is complete. In some implementations, the critical path may be associated with execution time. For example, the critical path may include portions of the program code, executed based on the test vector, that take a longest amount of time to be executed (as compared to other portions of the program code that finish executing at an earlier time). Additionally, or alternatively, the critical path may be associated with another type of resource usage, such as a memory usage critical path, a power usage critical path, a latency critical path, or the like. In some implementations, the critical path may be associated with a single thread of execution. Additionally, or alternatively, the critical path may be associated with multiple threads of execution (e.g., when the critical path includes a dependency chain between two or more execution threads).

In some implementations, client device 210 may identify the critical path based on executing the program code using the test vector. For example, client device 210 may execute the program code using the test vector in order to determine run-time profiling information. Here, client device 210 may identify the critical path based on the run-time profiling information that identifies execution time of program code that corresponds to one or more blocks, a number of times a function was called in the execution of the program code, a call tree associated with executing the program code, processor affinity information associated with executing the program code (e.g., for multi-threaded applications), or the like.

In some implementations, client device 210 may identify multiple critical paths. For example, client device 210 may determine multiple test vectors, and may identify multiple critical paths based on executing the program code using the multiple test vectors.

In some implementations, client device 210 may display, to the user, information associated with the critical path. For example, client device 210 may, within the model canvas, highlight one or more blocks that lie on the critical path, modify a color of one or more blocks that lie on the critical path, or the like. In some implementations, client device 210 may allow the user to modify the critical path. For example, client device 210 may provide an affordance that allows the user to add a block to the critical path, remove a block from the critical path, confirm the critical path, or the like.

As further shown in FIG. 6, process 600 may include applying, to a portion of the model that lies on the critical path, a modification technique associated with generating the program code (block 615). For example, client device 210 may apply, to a portion of the model that lies on the critical path, a modification technique associated with generating the program code. In some implementations, client device 210 may apply the modification technique, associated with generating the program code, after client device 210 identifies the critical path. Additionally, or alternatively, client device 210 may apply the modification technique when client device 210 receives information indicating that client device 210 is to apply the modification technique.

In some implementations, client device 210 may apply the modification technique to the portion of the model (e.g., a block within a block, a block, a group of blocks, a subsystem, a group of subsystems, etc.) that lies on the critical path in a manner similar to that described above with regard to FIG. 5. In some implementations, after applying the modification technique, process 600 may return to block 515. In other words, client device 210 may apply a modification technique to the portion of the model, may regenerate the program code, and may determine (e.g., based on the same test vector, based on a different test vector) whether the regenerated program code satisfies the set of performance criteria. In this way, client device 210 may optimize program code generated from the model based on identifying one or more critical paths associated with program code generated from the model.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Implementations described herein may allow a TCE to apply, to a model, one or more modification techniques associated with a manner in which program code is generated from the model. The TCE may then determine profiling information (e.g., static profiling information, predicted profiling information, simulated profiling information, run-time profiling information, etc.), associated with the program code, and may apply additional modification techniques such that the program code, when regenerated and executed, satisfies a set of performance criteria (or improves upon the set of performance criteria without satisfying the set of performance criteria).

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

The term program code is to be broadly interpreted to include text-based code that may be automatically executed (e.g., C code, C++ code, Hardware Description Language (HDL) code, very-high-speed integrated circuits (VHSIC) HDL(VHDL) code, Verilog, Java, and/or other types of hardware or software based code that may be compiled and/or synthesized); binary code that may be executed (e.g., executable files that may directly be executed by an operating system, bitstream files that can be used to configure a field programmable gate array (FPGA), Java byte code, object files combined together with linker directives, source code, makefiles, etc.); text files that may be executed in conjunction with other executables. In one example, program code may include different combinations of the above-identified classes (e.g., text-based code, binary code, text files, etc.). Alternatively, or additionally, program code may be of any type, such as function, script, object, etc., and a portion of program code may include one or more characters, lines, etc. of the program code.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

Certain user interfaces have been described herein and/or shown in the figures. A user interface may include a graphical user interface, a non-graphical user interface, a text-based user interface, etc. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
  determining, based on profiling information for code generated from a first model that has a plurality of parts, that a first performance value of a performance metric, associated with executing the code generated from the first model, does not satisfy a performance criterion for the performance metric,
    the performance criterion being one of a plurality of performance criteria, and
    the performance metric being one of a plurality of performance metrics, and
    the determining that the first performance value does not satisfy the performance criterion being performed by one or more processors;
  selecting a modification technique for application to the first model,
    the modification technique being associated with a manner in which the code is generated from the first model,
    the modification technique being one of a plurality of modification techniques,
    the modification technique, when applied, to change the first performance value of the performance metric that does not satisfy the performance criterion, and
    the selecting being performed by the one or more processors;
  applying the modification technique to the first model,
    the applying being performed by the one or more processors;
  generating a second model based on applying the modification technique to the first model,
    the generating the second model being performed by the one or more processors;
  generating code for the second model,
    the generating the code for the second model being performed by the one or more processors;
  profiling the code generated for the second model,
    the profiling being performed by the one or more processors; and
  determining, based on the profiling, whether a second performance value of the performance metric, associated with executing the code generated for the second model, satisfies the performance criterion or is closer to satisfying the performance criterion than the first performance value,
    the determining whether the second performance value satisfies the performance criterion or is closer to satisfying the performance criterion than the first performance value being performed by the one or more processors.

2. The method of claim 1, where applying the modification technique to the first model includes applying the modification technique to one or more of the plurality of parts of the first model,
  where the first model is a graphical model and the one or more of the plurality of parts includes at least one of:
  a block included in the first model;
  a group of blocks included in the first model;
  a subsystem included in the first model;
  a group of subsystems included in the first model;
  a model reference included in the first model;
  another model included in the first model; or
  a group of models included in the first model.

3. The method of claim 1, further comprising:
  analyzing the code generated from the first model; and
  obtaining static profiling information based on analyzing the code generated from the first model.

4. The method of claim 1, further comprising:
  causing the code generated for the first model to be executed; and
  obtaining run-time profiling information based on a result of causing the code generated from the first model to be executed.

5. The method of claim 1, further comprising:
  identifying a critical path associated with the code generated for the first model; and
  where applying the modification technique further comprises:
    identifying one or more of the plurality of parts that correspond to a portion of the code generated for the first model, the portion of the code generated from for the first model corresponding to the identified critical path; and applying the modification technique to the identified one or more of the plurality of parts.

6. The method of claim 1, further comprising:
presenting the second model for display to a user,
the second model being presented for display after the modification technique is applied to the first model.

7. The method of claim 1, further comprising:
determining a first numerical result, associated with the first model, before applying the modification technique to the first model;
determining a second numerical result, associated with the second model, after generating the second model;
identifying a numerical tolerance associated with the first model;
comparing a difference between the first numerical result and the second numerical result to the numerical tolerance; and
rejecting the modification technique based on comparing the difference between the first numerical result and the second numerical result to the numerical tolerance.

8. The method of claim 1, where selecting the modification technique for application to the first model comprises:
selecting the modification technique based on information associated with the performance criterion.

9. A method, comprising:
receiving a set of performance criteria for first program code generated based on a model,
the set of performance criteria including multiple performance criteria associated with multiple performance metrics, and
the receiving being performed by one or more processors;
determining, based on profiling information associated with the first program code, that the set of performance criteria is not satisfied,
the determining being performed by the one or more processors;
identifying, based on the profiling information and based on determining that the set of performance criteria is not satisfied, a modification technique to be applied to the model,
the modification technique being associated with a manner in which the first program code is generated from the model,
the modification technique being one of a plurality of modification techniques,
the identifying being performed by the one or more processors, and
identifying the modification technique including:
comparing a first effect of a first modification technique and a second effect of a second modification technique,
the first effect being associated with a first performance criterion of the multiple performance criteria, and
the second effect being associated with a second performance criterion of the multiple performance criteria; and
the modification technique being identified as the first modification technique or the second modification technique based on comparing the first effect and the second effect; and applying, based on determining that the set of performance criteria is not satisfied, the modification technique to the model,
the modification technique being applied to the model to cause second program code, when generated after modifying the model, to satisfy the set of performance criteria or be closer to satisfying the set of performance criteria than the first program code, and
the applying being performed by the one or more processors.

10. The method of claim 9, where the multiple performance metrics include at least one of:
memory usage associated with executing program code;
execution throughput associated with executing program code;
power usage associated with executing program code;
latency associated with executing program code; or
input/output utilization associated with executing program code.

11. The method of claim 9, where determining that the set of performance criteria is not satisfied comprises:
comparing first profiling information to the first performance criterion,
the first profiling information corresponding to a first performance metric associated with the first performance criterion, and
the first performance criterion being included in the set of performance criteria;
comparing second profiling information to the second performance criterion,
the second profiling information corresponding to a second performance metric associated with the second performance criterion, and
the second performance criterion being included in the set of performance criteria;
determining that the first profiling information does not satisfy the first performance criterion or that the second profiling information does not satisfy the second performance criterion.

12. The method of claim 9, where receiving the set of performance criteria comprises:
receiving the set of performance criteria based on user input provided via a user interface.

13. The method of claim 9, further comprising:
determining a set of weights associated with the set of performance criteria,
a weight, of the set of weights, corresponding to a performance criterion of the set of performance criteria; and
where determining that the set of performance criteria is not satisfied further comprises:
determining that the set of performance criteria is not satisfied based on the set of weights.

14. The method of claim 13, where determining the set of weights associated with the set of performance criteria comprises:
automatically determining the set of weights based on information associated with the model.

15. The method of claim 13, where at least two performance criteria, of the set of performance criteria, correspond to a single performance metric of the multiple performance metrics, and
at least two weights, of the set of weights, correspond to the at least two performance criteria.

16. The method of claim 9, further comprising:
providing, for display, information that indicates that particular profiling information does not satisfy corresponding performance criteria,
the particular profiling information being included in the profiling information, and
the corresponding performance criteria being included in the set of performance criteria.

17. The method of claim 9, where the model is a time based model.

18. A method, comprising:
generating program code based on a model,
the program code being generated such that a first portion of the program code is to be executed on first target hardware and a second portion of the program code is to be executed on second target hardware,
the first target hardware being different than the second target hardware, and
the generating the program code being performed by one or more processors;
obtaining performance criteria for the program code,
the obtaining being performed by the one or more processors;
generating profiling information associated with the program code,
the generating the profiling information being performed by the one or more processors;
determining, based on the profiling information, that the performance criteria is not satisfied,
the determining being performed by the one or more processors; and
identifying, based on determining that the performance criteria is not satisfied, a modification technique that is to be applied to the model,
the modification technique being associated with a manner in which the program code is generated from the model,
the identifying being performed by the one or more processors;
applying, based on determining that the performance criteria is not satisfied, the modification technique to the model,
the modification technique being applied to the model to cause other program code, when regenerated based on modifying the model, to satisfy the performance criteria, and
the applying being performed by the one or more processors.

19. The method of claim 18, where the first target hardware includes a first processing core, associated with a processor, and the second target hardware includes a second processing core associated with the processor.

20. The method of claim 18, where the first target hardware includes a first processor and the second target hardware includes a second processor.

21. The method of claim 18, where the profiling information includes at least one of:
static profiling information;
run-time profiling information;
simulated profiling information; or
predicted profiling information.

22. A method, comprising:
identifying performance criteria for program code corresponding to a model,
the identifying the performance criteria being performed by one or more processors;
generating simulated profiling information or predicted profiling information associated with the program code,
the generating being performed by the one or more processors;
determining, based on the simulated profiling information or the predicted profiling information, that the performance criteria is not satisfied,
the determining being performed by the one or more processors; and
identifying, based on the profiling information, a modification technique that is to be applied to the model,
the modification technique being associated with a manner in which the program code is generated from the model,
the identifying the modification technique being performed by the one or more processors;
applying, based on determining that the performance criteria is not satisfied, the modification technique to the model,
the modification technique being applied to the model to cause other program code, when generated based on modifying the model, to satisfy the performance criteria or be closer to satisfying the performance criteria than the program code, and
the applying being performed by the one or more processors.

23. The method of claim 22, where generating the simulated profiling information comprises:
causing the model to be executed in a technical computing environment in order to perform a simulation associated with the model; and
generating the simulated profiling information based on a result of causing the model to be executed.

24. The method of claim 22, where generating the predicted profiling information comprises:
obtaining historical profiling information associated with the model,
the historical profiling information including profiling information associated with the model and determined at an earlier time; and
generating the predicted profiling information, associated with the model, based on the historical profiling information associated with the model.

25. The method of claim 22, where generating the predicted profiling information comprises:
obtaining historical profiling information associated with one or more other models,
the historical profiling information being profiling information associated with the one or more other models and determined at one or more earlier times; and
generating the predicted profiling information, associated with the model, based on the historical profiling information associated with the one or more other models.

26. The method of claim 22, where generating the simulated profiling information or the predicted profiling information comprises:
generating the simulated profiling information or the predicted profiling information without causing the program code, corresponding to the model, to be generated.

27. The method of claim 22, where the modification technique is applied to the model to cause the other program code, when generated based on modifying the model, to satisfy the performance criteria.

28. A computer-readable medium storing instructions, the instructions comprising:

one or more instructions that, when executed by one or more processors, cause the one or more processors to:
- receive a set of performance criteria for program code generated based on a model;
- determine profiling information associated with the program code;
- identify, based on the profiling information, that the set of performance criteria is not satisfied; and
- apply, based on determining that the set of performance criteria is not satisfied, a modification technique to the model,
  - the modification technique being applied such that only a portion of the model is modified,
  - the modification technique being applied to cause other program code, generated after modifying the model, to satisfy the set of performance criteria, and
  - the modification technique being associated with a manner in which the program code is generated from the model.

29. The computer-readable medium of claim 28, where the set of performance criteria includes multiple performance criteria,
- each performance criteria, of the multiple performance criteria, corresponding to a different performance metric of a set of performance metrics.

30. The computer-readable medium of claim 28, where the model is a textual model and the portion of the model includes at least one of:
- a textual program;
- a script;
- a function;
- an object;
- a method of an object; or
- another textual model.

31. The computer-readable medium of claim 28, where the modification technique includes a technique associated with at least one of:
- an input/output selection technique;
- a threading technique;
- a code generation modification technique;
- a pipelining technique;
- an algorithm modification technique;
- a memory management technique; or
- a parallel execution technique.

32. The computer-readable medium of claim 28, where the modification technique includes at least one of:
- a technique associated with combining two or more blocks of the model;
- a technique associated with dividing a block of the model into two or more blocks;
- a technique associated with combining two or more subsystems of the model;
- a technique associated with dividing a subsystem of the model into two or more subsystems;
- a technique associated with removing a block of the model; or
- a technique associated with adding a block to the model.

33. The computer-readable medium of claim 28, where the one or more instructions, that cause the one or more processors to identify that the set of performance criteria is not satisfied, cause the one or more processors to:
- determine a test vector associated with the model;
- determine the profiling information, associated with the program code, by executing the program code using the test vector; and
- identify that the set of performance criteria is not satisfied based on the profiling information determined using the test vector.

* * * * *

UNITED STATES PATENT AND TRADEMARK OFFICE
CERTIFICATE OF CORRECTION

| | | |
|---|---|---|
| PATENT NO. | : 9,569,179 B1 | |
| APPLICATION NO. | : 14/559551 | |
| DATED | : February 14, 2017 | |
| INVENTOR(S) | : Mazen A. Kachmar et al. | |

It is certified that error appears in the above-identified patent and that said Letters Patent is hereby corrected as shown below:

Please correct Claim 5 as follows:
Column 29, Line 1, after "the portion of the code generated" delete "from".

Signed and Sealed this
Eighth Day of August, 2017

Joseph Matal
*Performing the Functions and Duties of the*
*Under Secretary of Commerce for Intellectual Property and*
*Director of the United States Patent and Trademark Office*